United States Patent
Reznik et al.

(10) Patent No.: US 7,130,330 B2
(45) Date of Patent: Oct. 31, 2006

(54) RECEIVER FOR WIRELESS TELECOMMUNICATION STATIONS AND METHOD

(75) Inventors: Alexander Reznik, Titusville, NJ (US); Donald M. Grieco, Manhassett, NY (US); Hyun Seok Oh, Incheon (KR)

(73) Assignee: InterDigital Technology Corp., Wilmington, DE (US)

( * ) Notice: Subject to any disclaimer, the term of this patent is extended or adjusted under 35 U.S.C. 154(b) by 24 days.

(21) Appl. No.: 11/175,935

(22) Filed: Jul. 6, 2005

(65) Prior Publication Data

US 2005/0243898 A1  Nov. 3, 2005

Related U.S. Application Data

(63) Continuation of application No. 10/830,699, filed on Apr. 23, 2004, now Pat. No. 6,940,895, which is a continuation of application No. 10/304,403, filed on Nov. 26, 2002, now Pat. No. 6,748,009.

(60) Provisional application No. 60/356,231, filed on Feb. 12, 2002.

(51) Int. Cl.
*H04B 1/69* (2006.01)
(52) U.S. Cl. .................................... 375/148
(58) Field of Classification Search ................ 375/144, 375/140, 147, 148, 142, 130; 370/336, 342, 370/441
See application file for complete search history.

(56) References Cited

U.S. PATENT DOCUMENTS

| | | | |
|---|---|---|---|
| 5,619,524 A | 4/1997 | Ling et al. | |
| 5,659,573 A | 8/1997 | Bruckert et al. | |
| 5,764,687 A | 6/1998 | Easton | |
| 6,229,842 B1 | 5/2001 | Schulist et al. | |
| 6,275,483 B1 | 8/2001 | Papasakellariou et al. | |
| 6,356,542 B1 | 3/2002 | Hayata | |
| 6,370,397 B1 | 4/2002 | Popovic et al. | |
| 6,408,039 B1 | 6/2002 | Ito | |
| 6,580,749 B1 | 6/2003 | Miura | |
| 6,625,197 B1 | 9/2003 | Lundby et al. | |
| 6,658,045 B1 | 12/2003 | Jin | |
| 6,748,009 B1 * | 6/2004 | Reznik et al. | 375/147 |
| 6,748,013 B1 * | 6/2004 | Reznik et al. | 375/148 |
| 6,940,895 B1 * | 9/2005 | Oh et al. | 375/148 |

FOREIGN PATENT DOCUMENTS

| | | |
|---|---|---|
| EP | 1126627 | 8/2001 |
| WO | 00/25439 | 5/2000 |

OTHER PUBLICATIONS

Hwang et al., "A Novel Architecture Design for Multicode CDMA Rake Receiver", IEEE, 1999, pp. 421-423.
Viterbi, "CDMA Spread Spectrum Communication", Addison-Wesley Publishing Co., 1995, pp. 87-92.

* cited by examiner

*Primary Examiner*—Tesfaldet Bocure
(74) *Attorney, Agent, or Firm*—Volpe and Koenig, P.C.

(57) ABSTRACT

The present invention is directed to an improved telecommunication receiver for receiving wireless multi-path communication signals. A novel RAKE receiver and a time diverse integration system for the calculation of the relative power of received signal samples are provided. Preferably, the receiver is embodied in a UE or base station of a CDMA wireless telecommunication system, such as a 3GPP system.

14 Claims, 36 Drawing Sheets

RECEIVER FOR WIRELESS TELECOMMUNICATION STATIONS AND METHOD

CROSS REFERENCE TO RELATED APPLICATIONS

This application is a continuation of U.S. patent application Ser. No. 10//830,699, filed Apr. 23, 2004 now U.S. Pat. No. 6,940,895, which is a continuation of U.S. patent application Ser. No. 10/304,403, filed Nov. 26, 2002 now U.S. Pat. No. 6,748,009, which claims the benefit of U.S. Provisional Application No. 60/356,231, filed Feb. 12, 2002, which are incorporated by reference as if fully set forth.

FIELD OF THE INVENTION

The present invention relates to wireless communication systems. More specifically, the present invention relates to the reception of communication signals in wireless communication systems.

BACKGROUND

Signal synchronization is important in wireless telecommunication. In modem systems, there are various levels of synchronization, such as, carrier, frequency, code, symbol, frame and network synchronization. At each level, synchronization can be divided into two phases: acquisition (initial synchronization) and tracking (fine synchronization).

A typical wireless communication system, such as specified in the 3rd Generation Partnership Project (3GPP), sends downlink communications from a base station to one or a plurality of User Equipments (UEs) and uplink communications from UEs to the base station. A receiver within each UE operates by correlating, or despreading, a received downlink signal with a known code sequence. The code sequence is synchronized to the received sequence in order to get the maximal output from the correlator.

A receiver may receive time offset copies of a transmitted communication signal known as multi-path. In multi-path fading channels, the signal energy is dispersed over a certain amount of time due to distinct echo paths and scattering. To improve performance, the receiver can estimate the channel by combining the multi-path copies of the signal. If the receiver has information about the channel profile, one way of gathering signal energy is then to assign several correlator branches to different echo paths and combine their outputs constructively. This is conventionally done using a structure known as a RAKE receiver.

Conventionally, a RAKE receiver has several "fingers", one for each echo path. In each finger, a path delay with respect to some reference delay, such as the direct or the earliest received path, must be estimated and tracked throughout the transmission. The estimation of the path's initial position in time may be obtained by using a multi-path search algorithm. The multi-path search algorithm does an extensive search through correlators to locate paths with a desired chip accuracy. RAKE receivers are able to exploit multi-path propagation to benefit from path diversity of transmitted signals. Using more than one path, or ray, increases the signal power available to the receiver. Additionally, it provides protection against fading since several paths are unlikely to be subject to a deep fade simultaneously. With suitable combining, this can improve the received signal-to-noise ratio, reduce fading and ease power control problems.

In the context of mobile UEs, due to their mobile movement and changes in the scattering environment, the delays and attenuation factors used in the search algorithm change as well. Therefore, it is desirable to measure the tapped delay line profile and to reallocate RAKE fingers whenever the delays have changed by a significant amount.

An important design problem of a RAKE receiver is how to accurately search and find multiple signal paths. There are several key parameters to be optimized for the receiver system, such as mean acquisition time, optimum threshold setting, probabilities of detection and false alarm, etc. One problem with a RAKE receiver is that the paths can disappear or may not be detected by a RAKE location process. Therefore, there exists a need for an improved receiver.

Another severe design problem of a RAKE receiver is that it is not always possible to separate the received energy into components due to distinct multipath components. This may happen, for example, if the relative delays of the various arriving paths are very small compared to the duration of a chip. Such situations often arise in indoor and urban communication channels. The problem is often referred to as the "Fat Finger Effect."

While there exist techniques for demodulating the data from Fat fingers, in order to apply such techniques the received energy belonging to a Fat finger must be identified. Unfortunately, typical RAKE correlators are designed to search for distinct single-path components in a multipath channel and are unable to perform this identification. Thus, there exists a need for a receiver capable of identifying the Fat fingers.

SUMMARY

The present invention is directed to an improved telecommunication receiver for receiving wireless multi-path communication signals. A novel RAKE receiver and a time diverse integration system for the calculation of the relative power of received signal samples are provided. Preferably, the receiver is embodied in a UE or base station of a CDMA wireless telecommunication system, such as a 3GPP system.

In one aspect of the invention, the station has a receiver for processing communication signals, which includes a RAKE receiver having up to a predetermined number of RAKE fingers, for assigning and combining a plurality of different signal paths of received communication signals. In one example, the maximum number of RAKE fingers is five (5) of which up to one is a Fat finger. A Fat finger of the RAKE receiver implements a Fat finger demodulation algorithm that, for example, may be a conventional Adaptive Filter.

The receiver has a RAKE locator that determines signal paths based on windows defined by groups of consecutive signal samples. Windows are defined where samples within a window exceed a first power threshold. The RAKE locator designates a number of such windows, up to the number RAKE fingers, as candidate windows based on relative power of the samples within the determined windows.

Preferably, the RAKE locator defines windows based on a window power level determined by summing power levels of its group of samples. A window is defined when its power level exceeds the first power threshold. Preferably, the RAKE locator designates windows as candidate windows based on windows having the highest power levels. However, a window is not designated if it is too close to another candidate window, i.e., if more than a specified number of samples are included in another window having a higher power level. For example, each window can contain a group of 21 samples and the candidate windows can have no more than 16 common samples so that the candidate windows are separated from each other by at least 5 consecutive samples.

Window search circuitry analyzes candidate windows to determine if the power of samples of the candidate windows exceeds a second threshold. The window search circuitry designates a Fat finger candidate window when at least one of the candidate windows has a selected number of candidate samples that exceed the second threshold. Preferably, the window search circuitry designates only one Fat finger candidate window, that being the candidate window having the greatest power level that also has a selected number, preferably four (4), of candidate samples having power levels exceeding the second threshold. Candidate samples are those samples remaining after pruning consecutive samples that exceed the second threshold.

A RAKE finger allocator assigns candidate windows for processing by either a conventional type of RAKE finger or a Fat RAKE finger such that candidate windows that are not designated as a Fat finger candidate window are each assigned to a different conventional RAKE finger. Preferably, the RAKE finger allocator assigns any candidate window designated as a Fat finger candidate window to a Fat RAKE finger.

Methods for processing communication signals using a RAKE receiver having up to a predetermined number, for example five (5), of RAKE fingers, which combines a plurality of different signal paths of received communication signals, are provided. Signal paths are determined based on windows defined by groups of consecutive signal samples in which samples within a window exceed a first power threshold. Up to the predetermined number RAKE fingers of such windows are designated as candidate windows based on relative power of the samples within the determined windows. Candidate windows are analyzed to determine if the power of samples of the candidate windows exceeds a second threshold. A Fat finger candidate window is designated when at least one of the candidate windows has a second predetermined number of candidate samples exceeding the second threshold. Candidate windows are assigned for processing by either a first type of RAKE finger or a different second type of Fat RAKE finger such that candidate windows that are not designated as a Fat finger candidate window are each assigned to a different RAKE finger of the first type.

Preferably, windows are defined which have a power level, determined by summing power levels of its group of samples, which exceeds the first power threshold and candidate windows are designated based on windows having the highest power levels. However, a window is not designated as a candidate window if more than a specified number of samples are included in another window having a higher power level. For example, each group of samples can contain 21 samples and the specified number can be set as 16 such that only windows separated from each other by at least 5 consecutive samples are designated as candidate windows.

Preferably, only up to one Fat finger candidate window is designated, being the candidate window having the greatest power level which also has the selected number of candidate power samples having power levels exceeding the second threshold. Candidate samples are samples remaining after pruning consecutive samples that exceed the second threshold.

Preferably, any candidate window designated as a Fat finger candidate window is assigned to a Fat RAKE finger that comprises an Adaptive Filter.

In a second aspect of the invention, the receiver is configured to process communication signals based in part on relative power of signal samples where relative power is calculated as a function of values corresponding to time diverse signal samples. A buffer is provided which stores at least values r(r) that correspond to signal samples $S_r$, which define a set R of samples. R is a subset of X consecutively received signal samples $S_0$ through $S_{X-1}$ that correspond to values r(0) through r(X-1). The number of elements of subset R is less than X such that R contains at least two mutually exclusive subsets of consecutive samples $\{S_0$ through $S_i\}$ and $\{S_j$ through $S_{x-1}\}$. Accordingly, R does not include sample $S_{i+1}$ or $S_{j-1}$. For convenience the buffer may store all values r(0) through r(X-1), but a substantially smaller buffer can be used if only the time diverse subsets of values represented by sample set R are stored.

A processor is operatively associated with the buffer for calculating relative sample power based on values r(r) that correspond to signal sample elements $S_r$ of the selected subset R of X consecutively received signal samples. Values of samples not contained in R, such as values r(i+1) or r(j−1) that correspond to signal sample elements $S_{i+1}$ and $S_{j-1}$, respectively, are not used in the calculation. Accordingly, relative power is calculated based on sample series representing at least two diverse time intervals.

Preferably, the processor is configured to calculate relative power utilizing a function based on an index set I comprised of mutually exclusive subsets of positive integers, such that, for each subset of I, a corresponding subset of R is utilized in calculating relative power.

Each pair of consecutive samples represents a sampling time interval t that corresponds to the sampling rate used in obtaining samples of a received signal. Preferably, at least two mutually exclusive subsets of the X consecutive samples exist that contain at least consecutive samples $\{S_{i+1}$ through $S_{i+51}\}$ and $\{S_{j-51}$ through $S_{j-1}\}$, respectively, and do not contain any elements of subset R. In such case, subset R is defined by at least three mutually exclusive subsets of consecutive samples, which represent groups of consecutive samples mutually offset in time by at least 50 times t.

Preferably, the processor is configured to calculate correlation power $P_k^{PN}$ between a PN scrambling sequence and a received signal for a sample $S_k$ based on:

$$P_k^{PN} = \sum_{m \in I} \left| \sum_{n=0}^{N-1} r(Nm+n)c^*(Nm+n-k) \right|$$

where N is a predefined constant and c(•) represents values corresponding to PN scrambling sequences. In order to limit processing time, index set I is preferably defined by no more than 150 elements. In one example, the index set I equals {0–9, 50–69, 100–199}, N is 256. This results in R being defined by three corresponding mutually exclusive subsets of consecutive samples that represent groups of samples mutually offset in time by more than 5000 times t.

A RAKE finger allocation block preferably includes the buffer and associated processor configured for time diverse integration so that correlation powers of samples $S_k$ are calculated in the allocation block on a time diverse integration basis. However, implementation of time diverse integration can be similarly applied to other components where relative signal sample power is calculated.

Other objects and advantages of the invention will be apparent to those of ordinary skill in the art from the following detailed description.

Figure 1:
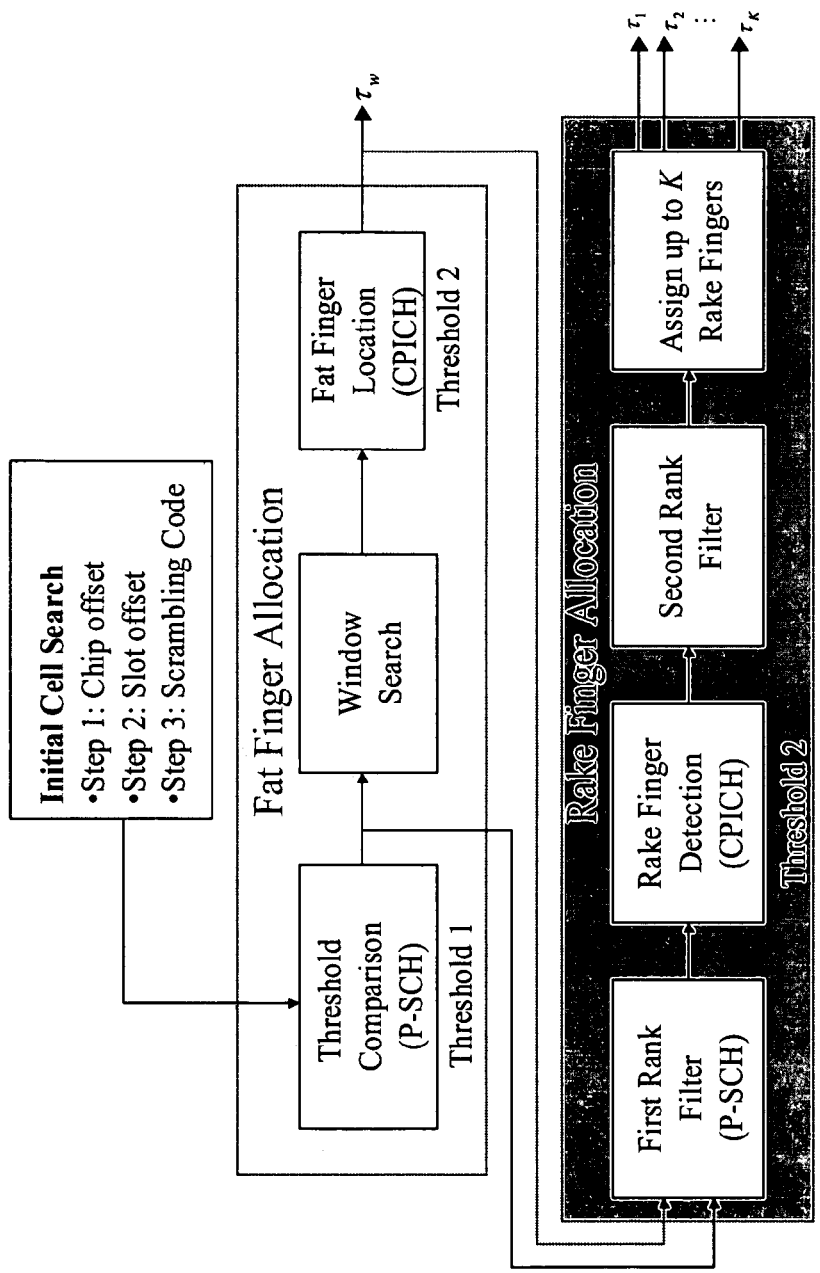
FIG. 1 is a block diagram of an initial Fat finger and RAKE finger allocation processors in accordance with the teachings of the present invention.

| TABLE OF ACRONYMS | |
|---|---|
| 3GPP | 3rd Generation Partnership Project |
| AF | Adaptive Filter |
| AWGN | Additive White Gaussian Noise |
| BCH | Broadcast Channel |
| CDMA | Code Division Multiple Access |
| CFAR | Constant False Alarm Rate |
| CPICH | Common Pilot Channel |
| FRF | First Rank Filter |
| HGC | Hierarchical Golay Correlator |
| MS | Mobile Station |
| P-CCPCH | Primary Common Control Physical Channel |
| PN | Pseudo Noise |
| PSC | Primary Synchronization Code |
| P-SCH | Primary Synchronization Channel |
| SSC | Secondary Synchronization Code |
| S-SCH | Secondary Synchronization Channel |
| SNR | Signal to Noise Ratio |
| UE | User Equipment |
| WG4 | Working Group 4 (of 3GPP) |

DETAILED DESCRIPTION OF THE PREFERRED EMBODIMENTS

The present invention is described below in the context of a communication system made in accordance with current 3rd Generation Partnership Project (3GPP) specifications. In such systems, CDMA communication signals are transmitted within system time frames at a specified chip rate. Wireless communication occurs between User Equipment (UE) and base stations known as Node Bs. Both UEs and Node Bs transmit and receive wireless communication signals and, accordingly, are generically referred to as wireless transmit receive units (WTRUs). In conjunction with the receiving equipment of either type of communication station, i.e. UE or Node B, a RAKE receiver in accordance with the teachings of the present invention may be advantageously employed to improve performance by efficient processing of received multi-path communication signals. Except as specified differently herein, the preferred processes for cell search, code acquisition, and synchronization is in accordance with current 3GPP specification.

In order to evaluate the performance of the RAKE receiver of the present invention, its performance was evaluated in view of various simulations. These included simulations using an Additive White Gaussian Noise (AWGN) channel and two different channels as specified by 3GPP Working Group 4 (WG4), known in the art as WG4 Case 1 and WG4 Case 5 channels under version 3.2 of 3GPP Technical Specifications.

The inventors have recognized that a propagation channel impulse response may comprise a "Fat" finger path in combination with standard RAKE finger paths. A Fat finger path represents multiple paths close to each other and each standard RAKE finger path represents a single path separated by at least one chip interval from other paths. Typically, a channel response does not have more than one "Fat"

finger path so the preferred embodiment described herein focuses on detecting only one "Fat" finger. The teachings of the invention, however, are equally applicable for detecting a plurality of "Fat" fingers.

In the present invention, a RAKE locator continuously looks for Fat finger and RAKE finger paths. The Fat finger path is assigned to a Fat finger comprised of a demodulating algorithm/system capable of demodulating the Fat finger path and each individual multi-path component is assigned to a standard RAKE finger, respectively, with a tracking mechanism present in each of these fingers. Such standard RAKE fingers that are separated by at least one chip width represent the RAKE receivers of the prior art. One example of a demodulating algorithm/system capable of demodulation the Fat finger path is an Adaptive Filter (AF).

The RAKE locator, shown in FIG. 1, plays an important role as the connection between the searching mechanism (Cell Search) and the RAKE receiver. After code phase acquisition has been established by a cell search process, the RAKE fingers are associated with detected code phases. A detected code phase corresponds to a time delay due to multi-path in a received radio channel. Since the delays of the channel multi-path are often non-stationary, it is necessary to continuously look for new multi-path components in the channel. The code phases due to multi-paths are then allocated to the RAKE receiver for demodulation. This coarse synchronization for each RAKE finger is then fine synchronized by a code tracking mechanism in each individual RAKE finger. The code phases allocated to a RAKE finger may disappear as a mobile UE moves and the delay profile of the received channel changes. These fingers are then de-allocated from the RAKE receiver and new code phases are re-allocated from a RAKE locator. This process is described in the RAKE Reallocation system set forth hereinafter.

FIG. 1 shows an overall block diagram for a RAKE locator designed for a 3GPP system that includes initial FAT finger and RAKE finger allocation processors. The locator cooperates with a 3GPP initial cell search algorithm to accelerate the speed of resolving the multi-paths.

During synchronization, a mobile station (UE) searches for a base station (BS) from which it receives the highest signal power. In a preferred embodiment, the cell search block determines the downlink scrambling code and frame synchronization of that base station in accordance with current 3GPP specifications. After the scrambling code has been identified, the RAKE receiver continuously requires the knowledge of the relative delay or code phase of each multi-path, or multi-path group for a Fat finger, of the radio channel.

During a first step of the cell search procedure, the UE uses the code of a Primary Synchronization Channel (P-SCH) to acquire slot synchronization to a cell. This is typically done with a single matched filter matched to the P-SCH channel. The code used by the P-SCH is common to all cells. The slot timing of the cell can be obtained by detecting peaks in the matched filter output.

During a second step of the cell search procedure, the UE uses a Secondary Synchronization Channel (S-SCH) to find frame synchronization and identify the code group of the cell found in the first step. This is done by correlating the received signal with all possible secondary synchronization code sequences, and identifying the maximum correlation value. Since the cyclic shifts of the sequences are unique, the code group as well as the frame synchronization is determined.

Figure 2:
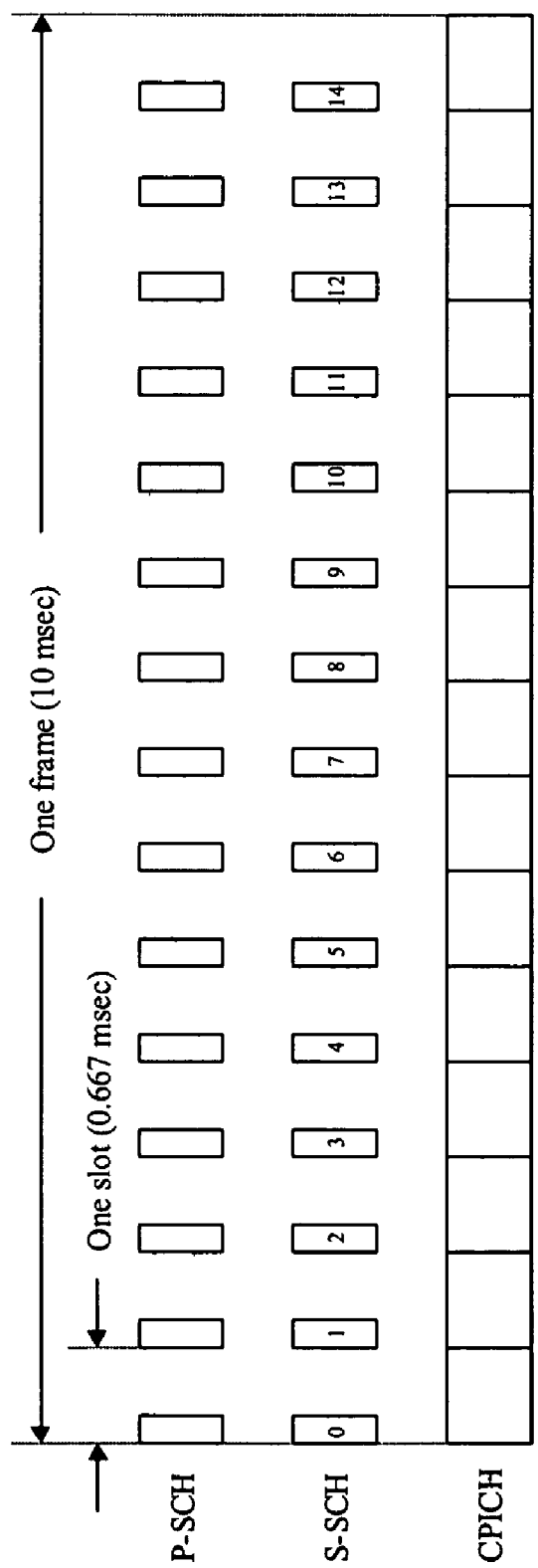
FIG. 2 is an illustration of frame and slot structures of P-SCH, S-SCH and CPICH channels of a 3GPP system.

During a third and final step of the cell search procedure, the UE determines the exact primary scrambling code used by the found cell. The primary scrambling code is typically identified through symbol-by-symbol correlation over a common pilot channel (CPICH) with all codes within the code group identified in the second step. After the primary scrambling code had been identified, the Primary Common Control Physical Channel (P-CCPCH) can be demodulated, and the system and cell specific information can be read from a Broadcast Channel (BCH) that is carried on the P-CCPCH. FIG. 2 is an exemplary illustration of the time frame and slot structures of P-SCH, S-SCH and CPICH.

The performance of the cell search algorithm has major impacts on the RAKE locator. If the cell search fails, the wrong PN scrambling code is assigned to the RAKE locator and consequently the RAKE locator generates a false path indication. Accordingly, the RAKE locator acts to verify the cell search algorithm and to remove false detections.

Figure 3:
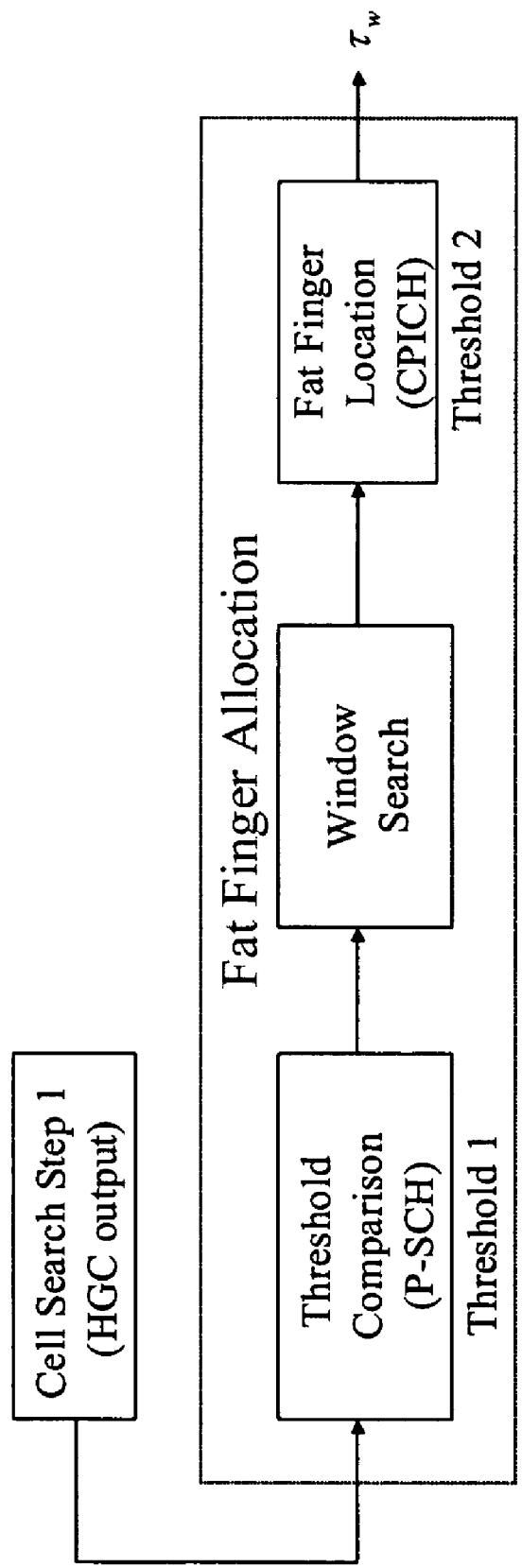
FIG. 3 is a block diagram of a Fat finger allocation processor.

FIG. 3 shows a block diagram of the Fat finger allocation processor. This processor includes three main blocks: Threshold Comparison block, Window Search block and FAT Finger Location block. The Threshold Comparison block preferably compares hierarchical Golay correlator (HGC) output in accordance with current 3GPP specification with a threshold $\eta_1$, to suppress noise components. The Window Search block selects a predetermined number, such as five (5) of the best window candidates containing the largest moving average window powers. Each designated window then becomes a candidate for one of the RAKE fingers. The Fat Finger Location block finds the window containing the maximum power.

The first threshold $\eta_1$, used in the Threshold Comparison block, is proportional to the average noise power in the P-SCH. A second threshold $\eta_2$ is used in the Fat Finger Location block that is based on the average noise power in the CPICH. The two thresholds, $\eta_1$ and $\eta_2$, determine the detection probability and false alarm probability of the receiver system.

Using the threshold comparisons, the FAT Finger Location is assigned to a window identified with a starting timing index $\tau_w$. This index is fed to an Adaptive Filter (AF), which comprises the "Fat" finger of the RAKE receiver, for further processing. The role of the FAT finger allocation process is to provide a window location and verify the powers of the FAT finger paths.

Figure 4:
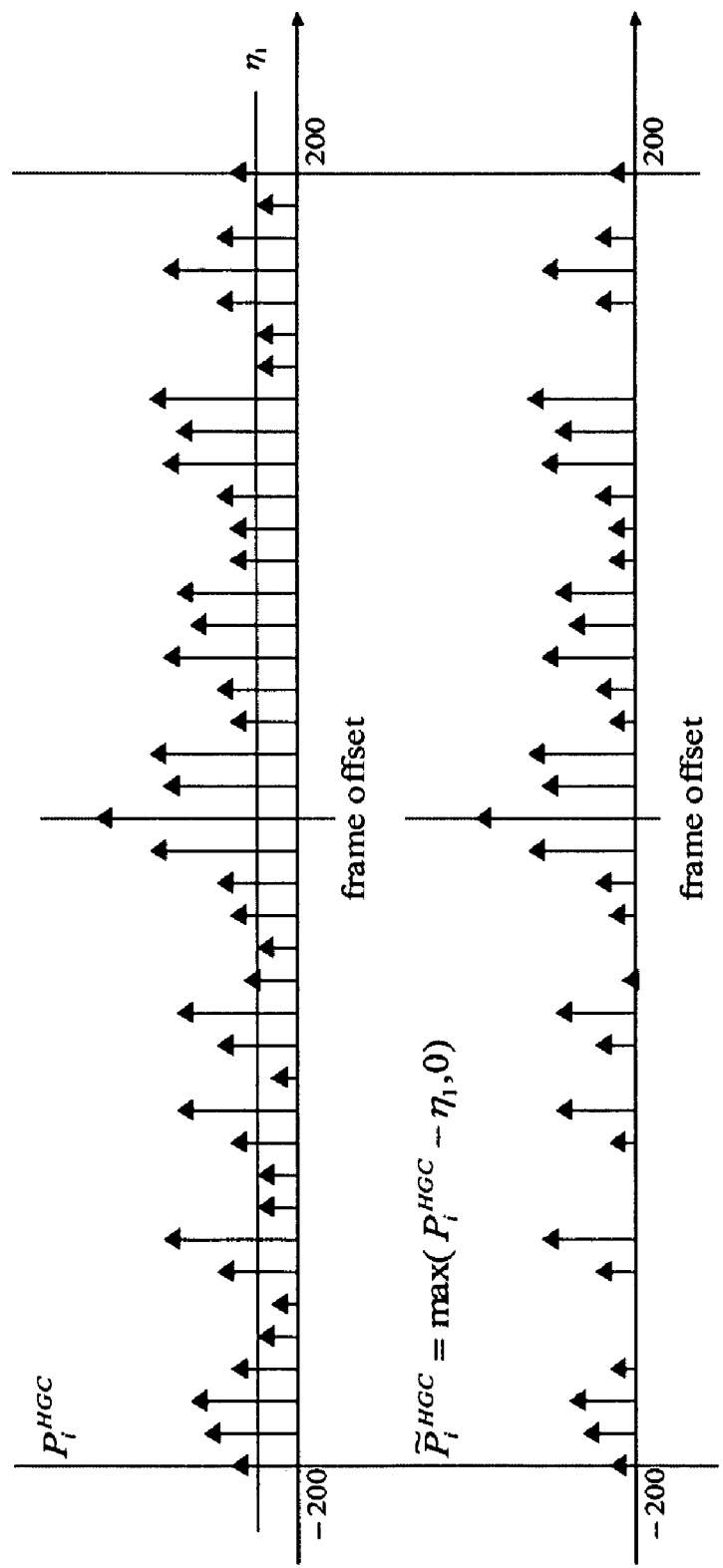
FIG. 4 is a graphical illustration of a threshold comparison block process.

FIG. 4 illustrates the process of the threshold comparison block. The task of the Threshold Comparison block is the pre-detection and search for the true code phase in the P-SCH channel. The cell search step 1 provides a slot boundary that is a value in the range 0 to 5119 (a slot at two samples per chip). Once the slot boundary is given, a window of ±200 samples with half-chip sampling interval around a slot boundary produces a total of 401 samples. The value of ±200 is preferred because the maximum delay spread of the radio channel is assumed to be ±100$T_c$.

Since the P-SCH is common to all cells, the input to the Threshold Comparison block contains values corresponding to path energies from all detectable base stations. Therefore post-detection is required to verify which signal belongs to the desired base station and to suppress other signals. To maintain a low probability of false alarm, it is necessary to determine an appropriate threshold $\eta_1$. This threshold should be proportional to the average noise power. If $\eta_1$ is too low, the probability of false alarm may be unacceptably high. If $\eta_1$ is too high, the detection probability may be too low. This is a trade-off in the selection of $\eta_1$.

The input to the Threshold Comparison block, i.e., the integrated HGC output of the cell search step 1, is compared to the threshold $\eta_1$ to separate the samples above and below the threshold. The output of the Threshold Comparison block is $$\tilde{P}_i^{HGC} = \max(P_i^{HGC} - \eta_1, 0), \quad -200 \leq i \leq 200. \tag{1}$$

where i=0 represents the slot boundary. The threshold is adaptively changed by the average noise power $\sigma_n^{HGC}$ such that $$\eta_1 = \alpha \sigma_n^{HGC}, \tag{2}$$

with a proper scaling factor $\alpha$.

The main task of the Window Search block is to find a predetermined number of candidate windows containing the largest powers with a maximum allowed overlap. The number of candidate windows corresponds to the number of available RAKE fingers, which in this example is five (5). The window size, for example, is 21 samples. The powers of the moving average (MA) sliding windows can be computed as $$P_i^{window} = \sum_{n=0}^{20} \tilde{P}_{i+n}^{HGC}, \quad -200 \leq i \leq 180, \tag{3}$$

where the power $\tilde{P}_i^{HGC}$ is given by Equation (1). Then the window powers are ranked in descending order such that $$P^{(1)} \geq P^{(2)} \geq P^{(3)} \geq, \tag{4}$$

with $P^{(1)} = \max(P_i^{window})$. For finding five windows, the preferred requirements are given by
1. The window candidates $P^{(1)} \rightarrow P^{(5)}$ should all exceed a minimum window power $P_{min}$, which is a design parameter, i.e., $$P^{(1)} \geq P^{(2)} \geq \ldots \geq P^{(5)} \geq P_{min}. \tag{5}$$

2. The window candidates are separated by at least 5 samples, i.e., for (j)th candidate $P^{(j)} = P_k^{window}$ and (j+1)th candidate $P^{(j+1)} = P_l^{window}$ should satisfy the condition $$\text{if } P_k^{window} \geq P_l^{window}, \text{ then } |k-l| \geq 5. \tag{6}$$

If requirement 1 is not met, fewer than five window candidates are determined and fewer than five fingers of the RAKE receiver are assigned, unassigned fingers remaining idle. If requirement 2 is not met, the candidate window having the highest power is used and those within 5 or less samples are not used.

Figure 5:
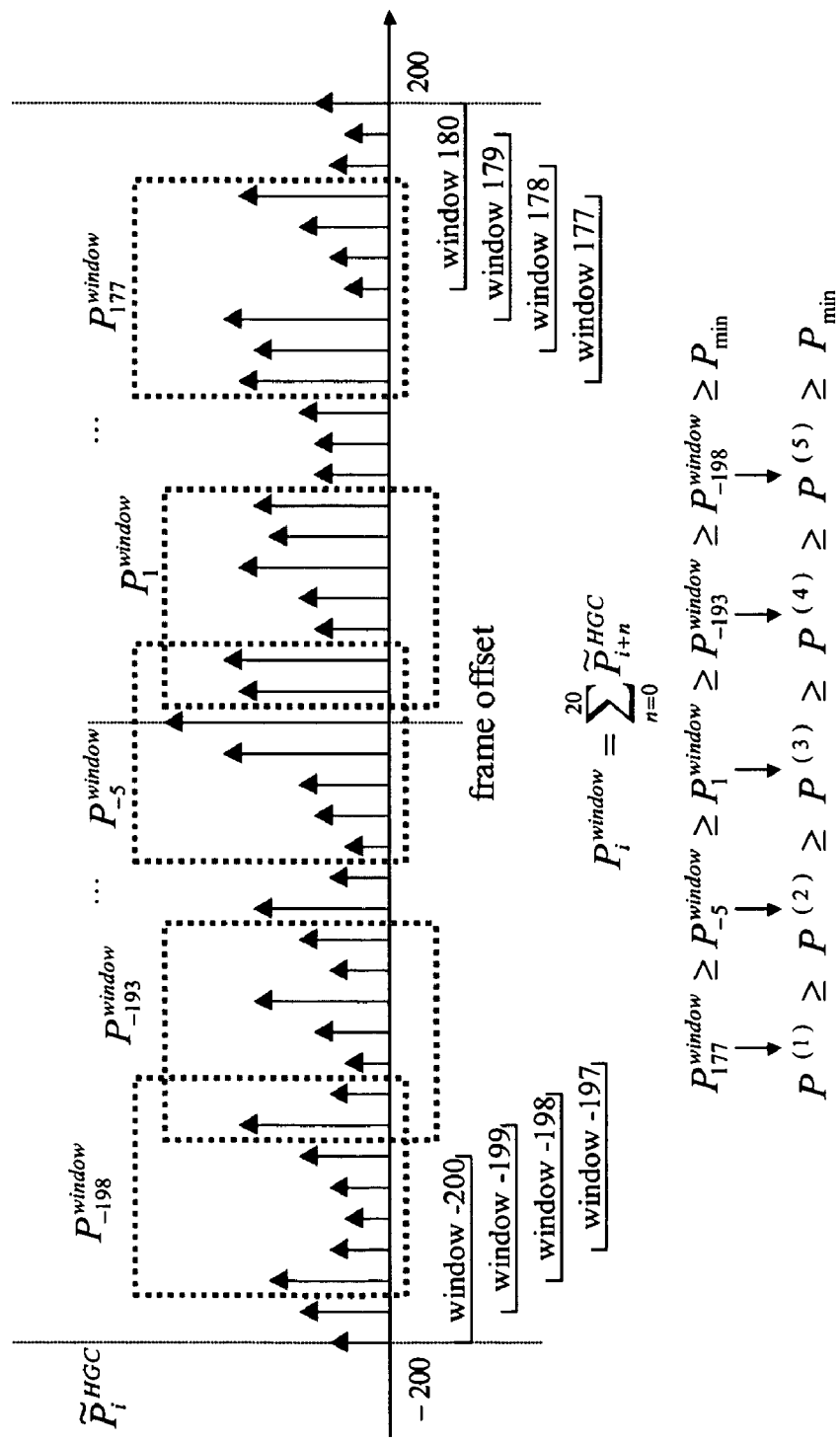
FIG. 5 is a graphical illustration of a window search block process.

FIG. 5 illustrates the window search procedure. First, compute $P_i^{window}$ as in Equation (3). Second, sort $P_i^{window}$ as descending order. Third, select the first five candidates that are separated by at least 5 samples. For convenience of illustration, only the first seven samples are indicated in each window shown in outline. As noted above the preferred window size is 21 samples.

If the window candidates overlap each other (for example, $\{P_{-193}^{window}, P_{-198}^{window}\}$ and $\{P_{-5}^{window}, P_1^{window}\}$ in FIG. 5, these regions may be saved in the buffer. In the FAT finger allocation block this is used to reduce the integration time for calculating correlation powers $P_k^{PN}$ between the PN scrambling sequence and the received signal. For example, assume that the first window candidate has 5 as a starting point and the second window candidate has a starting point 11. The overlapping samples for the 21 sample size windows, are 11 to 25 (16 samples). In this region, it is better to prevent double calculations for $P_k^{PN}$.

The FAT Finger Location block performs the post-detection process utilizing the CPICH channel. Since CPICH is unique for each cell in a given area, the correlation over the CPICH gives true code phase for a specific cell. For example, assume that three base stations are available in the radio channel to a UE. If the UE is communicating with BS1, then the correlation over the CPICH channel emphasizes the code phases of the BS1 only and suppresses the code phases of BS2 and BS3. The power of the correlation between the received signal and the PN scrambling sequences are computed as $$P_k^{PN} = \sum_{m=0}^{J-1} \left| \sum_{n=0}^{N-1} r(Nm+n) c^*(Nm+n-k) \right|, \quad -100 \leq k \leq 100 \tag{7}$$

where the sequences of $r(\bullet)$ and $c(\bullet)$ represent the received signal and PN scrambling sequence, respectively. Typical values of J and N are J=50 (5 slots), N=256 (one symbol length in chips). As currently specified in 3GPP, the sampling rates of the received signal and the PN scrambling sequences are different. The sampling rate of the received signal is $T_c/2$. However the PN scrambling sequence is sampled at $T_c$ interval. Therefore (7) can be modified as $$P_{2k}^{PN} = \sum_{m=0}^{J-1} \left| \sum_{n=0}^{N-1} r_{even}(Nm+n) c^*(Nm+n-k) \right|, \tag{8}$$

$$P_{2k+1}^{PN} = \sum_{m=0}^{J-1} \left| \sum_{n=0}^{N-1} r_{odd}(Nm+n) c^*(Nm+n-k) \right|,$$

$$-200 \leq k \leq 200,$$

where $r_{even}(\bullet)$ and $r_{odd}(\bullet)$ represent even and odd samples of the received signal respectively. To simplify the equation (7), let $$x(m) = \sum_{n=0}^{N-1} r(m,n) c^*(m,n) = a(m) + jb(m).$$

The absolute value operation can be approximated as $$|x(m)| \approx \max(|a(m)|, |b(m)|) + 0.5 \min(|a(m)|, |b(m)|). \tag{9}$$

Then, equation (7) is simplified with the help of (9) such that $$P_k^{PN} = \sum_{m=0}^{J-1} \left| \sum_{n=0}^{N-1} r(Nm+n) c^*(Nm+n-k) \right| \tag{10}$$

$$= \sum_{m=0}^{J-1} |x(m)|$$

$$= \sum_{m=0}^{J-1} \sqrt{a(m)^2 + b(m)^2}$$

-continued $$\approx \sum_{m=0}^{J-1} [\max(|a(m)|, |b(m)|) + 0.5 \min(|a(m)|, |b(m)|)].$$

Furthermore, since the different sampling rates between the received signal and the scrambling sequence have to be taken into account, (10) can be expressed as $$P_{2k}^{PN} = \sum_{m=0}^{J-1} \left| \sum_{n=0}^{N-1} r_{even}(Nm+n)c^*(Nm+n-k) \right| \quad (11)$$

$$\Rightarrow P_{2k}^{PN} \approx \sum_{m=0}^{J-1} \max(|a_{even}(m)|, b_{even}(m)|) + 0.5 \min(|a_{even}(m)|, b_{even}(m)|),$$

$$P_{2k+1}^{PN} = \sum_{m=0}^{J-1} \left| \sum_{n=0}^{N-1} r_{odd}(Nm+n)c^*(Nm+n-k) \right|$$

$$\Rightarrow P_{2k+1}^{PN} \approx \sum_{m=0}^{J-1} \max(|a_{odd}(m)|, b_{odd}(m)|) + 0.5 \min(|a_{odd}(m)|, b_{odd}(m)|).$$

If the correlation power $P_k^{PN}$ is greater than the second threshold $\eta_2$, then the code phase is accepted as a true path. The second threshold $\eta_2$ is proportional to the average noise power, i.e., $$\eta_2 = \beta \sigma_n^{PN}, \quad (12)$$

where $\beta$ is a scaling factor and $\sigma_n^{PN}$ is the average noise power given by $$\sigma_n^{PN} = \sum_{m=0}^{J-1} \left| \sum_{n=0}^{N-1} r_{even}(Nm+n)c_{AUX}^*(Nm+n) \right|. \quad (13)$$

Here $c_{AUX}(\cdot)$ represents an auxiliary PN scrambling code. Equation (13) is also simplified as (10) using the modified absolute value operator.

If the FAT finger is assigned at the point $\tau_w$, then the powers $\tilde{P}_i^{HGC}$ in (1) reset to be zero for further processing in RAKE allocation so that an individual standard RAKE finger is not assigned at the FAT finger location.

$$\tilde{P}_i^{HGC}=0, \; i=\tau_w, \tau_w+1, \ldots, \tau_w+20. \quad (14)$$

Figure 6:
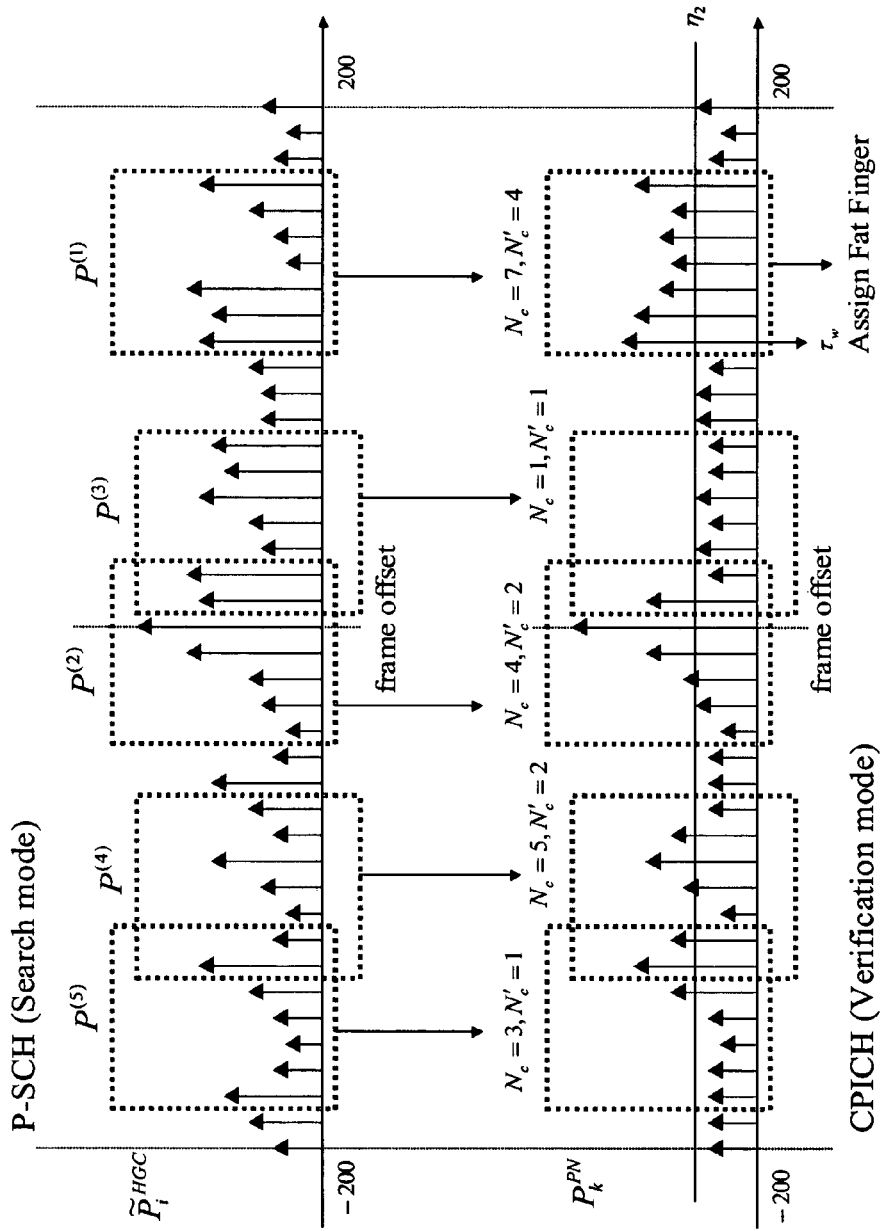
FIG. 6 is a graphical illustration of a Fat finger location block process.

FIG. 6 shows the FAT Finger Location block process. The upper part shows the selection of the best five window candidates. This process is the pre-detection part. The window indices are fed into the post-detection part corresponding to the lower part. The lower part computes the correlation powers using equation (11). Preferably, a Fat finger is assigned when a selected window has a minimum number of non-consecutive samples above the second threshold.

If the FAT finger is not assigned, the output of the Threshold Comparison block is the input of the RAKE finger allocation processor. In this case non-consecutive measurements are preferably pruned to make sure that the paths are separated by at least one-chip. This may be performed, for example, by starting with the highest sample in the given window, removing the adjacent samples, leaving the next-to-adjacent samples, removing the samples adjacent to the ones just kept, etc.

Figure 7:
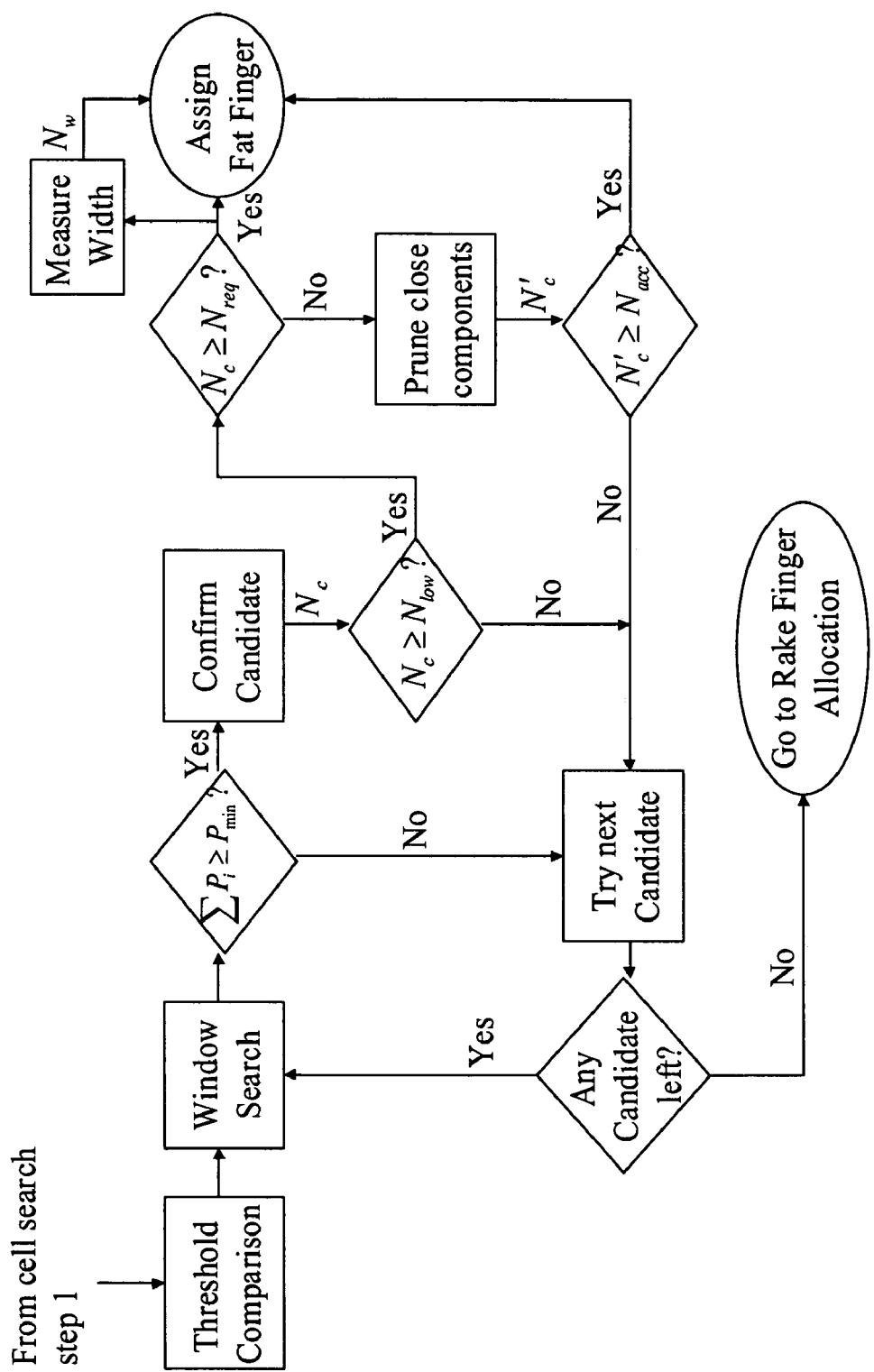
FIG. 7 is a Fat finger allocation flowchart.

FIG. 7 is a flowchart illustrating a preferred Fat finger allocation method. The parameters in this flowchart are:

$P_{min}$: The minimum average window power.

$N_c$: The number of samples above the second threshold $\eta_2$.

$N_{low}$: The lowest allowed number of samples above the second threshold $\eta_2$.

$N_{req}$: The required number of samples above the second threshold $\eta_2$.

$N'_c$: The number of samples above the second threshold after pruning close components.

$N_{acc}$: The acceptable number of samples above the second threshold after pruning. Notice that the multi-path width $N_w$ is measured and sent to the Fat Finger that assigns a matching number of taps.

The number of samples above the second threshold ($N_c$) and the number of samples above the threshold after pruning ($N'_c$) is counted. Finally, the right-most window is designated as a FAT finger because it alone meets the criterion for a minimum value of $N'_c$, which is preferably set at 4. That is, the FAT finger is only used if there are at least 4 samples above the threshold, each separated by at least one chip in a selected window.ponents.

$N_{acc}$: The acceptable number of samples above the second threshold after pruning. Notice that the multi-path width $N_w$ is measured and sent to the Fat Finger that assigns a matching number of taps.

The number of samples above the second threshold ($N_c$) and the number of samples above the threshold after pruning ($N'_c$) is counted. Finally, the right-most window is designated as a FAT finger because it alone meets the criterion for a minimum value of $N'_c$, which is preferably set at 4. That is, the FAT finger is only used if there are at least 4 samples above the threshold, each separated by at least one chip in a selected window.

As illustrated in FIG. 7, the FAT finger location process 10 commences by checking the first candidate in the window to see if its total power (step 1) exceeds the minimum acceptable power. If not, the location block tries the next candidate. If there is no candidate satisfying this condition, the process goes to step 6. The symbol-by-symbol correlation between the input signal r(m, n) and the locally generated PN scrambling code c(m, n) is then computed (step 2) as follows:

$$P_{2k}^{PN} = \sum_{m=0}^{J-1} \left| \sum_{n=0}^{N-1} r_{even}(Nm+n)c^*(Nm+n-k) \right|, \quad (15)$$

$$P_{2k+1}^{PN} = \sum_{m=0}^{J-1} \left| \sum_{n=0}^{N-1} r_{odd}(Nm+n)c^*(Nm+n-k) \right|,$$

where J is the number of symbols accumulated and N is the symbol length in chips. Then compare with the second threshold $\eta_2$. The number of samples $N_c$ above the threshold $\eta_2$ is counted (step 3) and, at step 4, are sorted into one of three different cases:

(a) Case 1: If $N_c < N_{low}$, go to step 1 and try the next candidate, if any.

(b) Case 2: If $N_{low} \leq N_c \leq N_{req}$, (i) Count $N'_c$, the number of samples above the second threshold after pruning samples.

(ii) Check if $N'_c$ is greater than $N_{acc}$, the acceptable number of samples after pruning. If yes, assign Fat finger and go to step 5. If not, go to step 1.

(c) Case 3: If $N_c \geq N_{req}$, assign Fat finger and go to step 5.

To prevent assignment of RAKE fingers in the FAT finger region, reset the HGC output in the FAT finger region of (1) is reset to zero, i.e., $$P_i^{HGC}=0, \; i=\tau_w, \tau_w+1, \ldots, \tau_w+20.$$

Once all of the candidates have been processed, the RAKE finger allocation process is entered (step 6).

Figure 8:
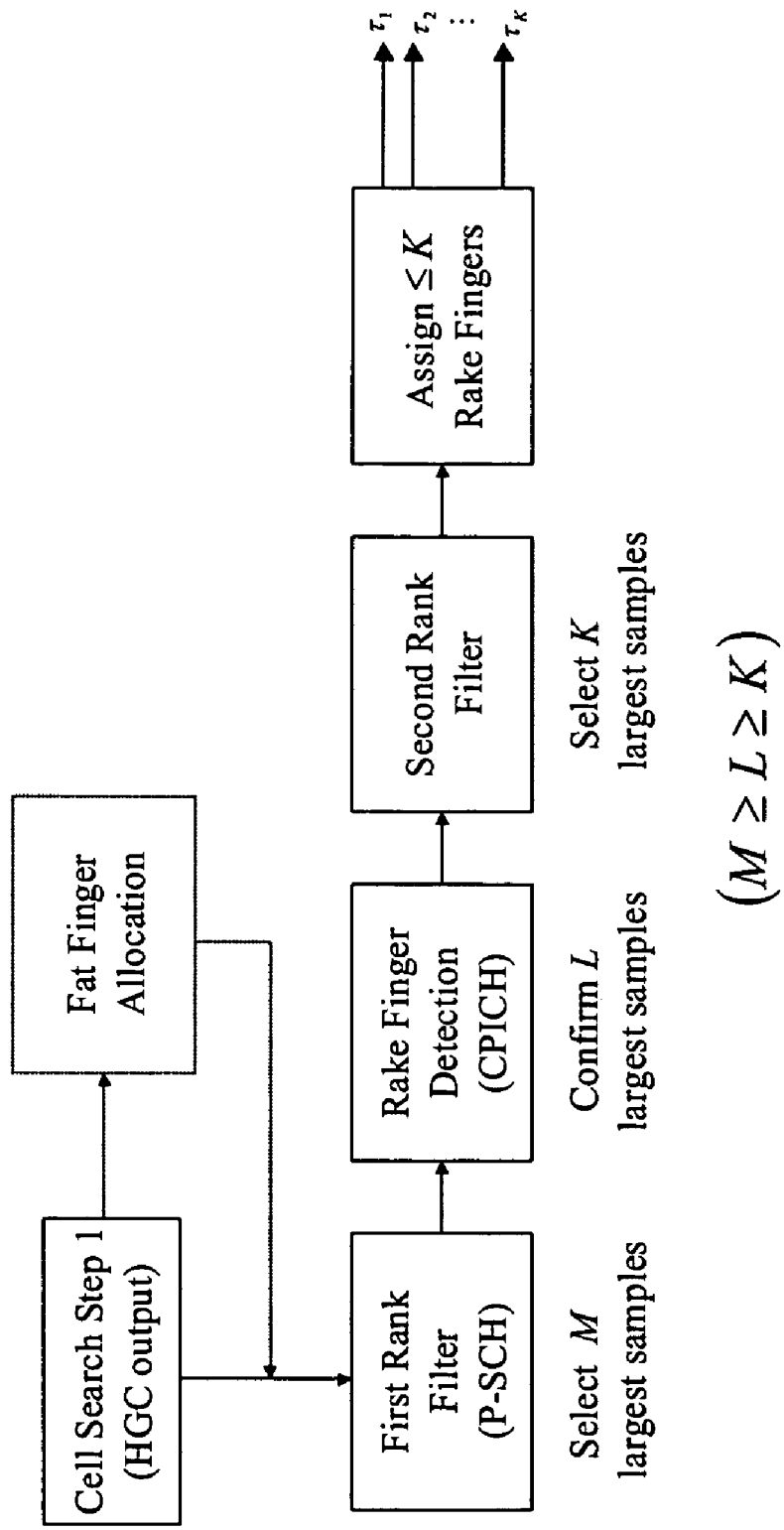
FIG. 8 is a block diagram of a RAKE finger allocation processor.

A block diagram of the RAKE finger allocation processor is shown in FIG. 8. The RAKE finger processor comprises a first rank filter, a RAKE finger detector, a second rank filter and an assignor. The First Rank Filter ranks the input $\tilde{P}_i^{HGC}$ from the cell search HGC in descending order and selects the M largest samples. These samples must be at least 2 samples away from each other. If there is no FAT finger assigned, then the output of threshold comparison block $\tilde{P}_i^{HGC}$ is fed directly into the First Rank Filter block. The input of this block is the HGC output power above the threshold $\eta_1$ as in Equation (1), i.e.:

$$\tilde{P}_i^{HGC}, \; -200 \leq i \leq 200. \quad (16)$$

This block ranks these powers in descending order such that:

$$P_{FRF}^{(1)} \geq P_{FRF}^{(2)} \geq \ldots \geq P_{FRF}^{(M)}, \quad (17)$$

where $P_{FRF}^{(1)} = \max(\tilde{P}_i^{HGC})$ and the subscript FRF represents First Rank Filter and M is a design parameter. The output of this block is not the correlation powers but the time indices corresponding to their powers, i.e.:

$$[I_1, I_2, \ldots, I_M] \quad (18)$$

These samples are preferably checked to make sure they are separated by 2 samples to get the preferred chip duration multi-path resolution and pruned if they are not sufficiently separated. In other words, the sample corresponding to $I_{j+1}$ is pruned if the following relationship is not satisfied:

$$|I_j - I_{j+1}| \geq 2, \; j=1,2,\ldots, M-1. \quad (19)$$

Figure 9:
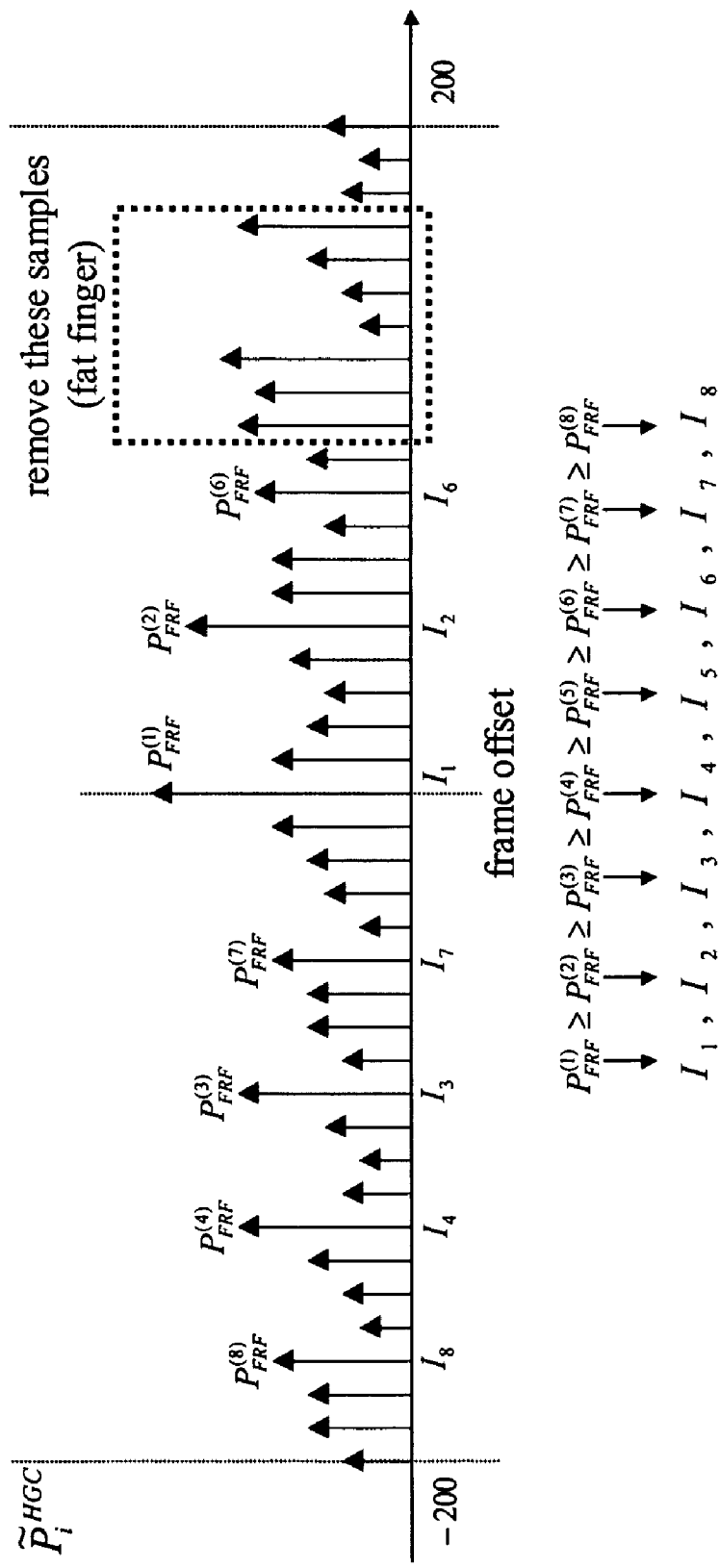
FIG. 9 is a graphical illustration of a first rank filter block process.

FIG. 9 shows an example where the 8 largest correlation powers are selected, not including the FAT finger region. The indices corresponding to these locations are fed into the RAKE Finger Detection block.

The RAKE Finger Detection block verifies whether the correlation powers corresponding to the indices provided by Equation (17) are greater than the second threshold $\eta_2$ in the CPICH power. The correlation powers can be obtained by:

$$P_k^{PN} = \sum_{m=0}^{J-1} \left| \sum_{n=0}^{N-1} r(256m+n)c^*(256m+n-k) \right|, \quad (20)$$

$$k = I_1, I_2, \cdots, I_M.$$

where the sampling rates of $r(\bullet)$ and $c(\bullet)$ are different, Equation (20) is modified as:

$$P_{2k}^{PN} = \sum_{m=0}^{J-1} \left| \sum_{n=0}^{N-1} r_{odd}(Nm+n)c^*(Nm+n-k) \right|, \quad (21)$$

$$P_{2k+1}^{PN} = \sum_{m=0}^{J-1} \left| \sum_{n=0}^{N-1} r_{even}(Nm+n)c^*(Nm+n-k) \right|,$$

$$k = I_1, I_2, \ldots, I_M.$$

Figure 10:
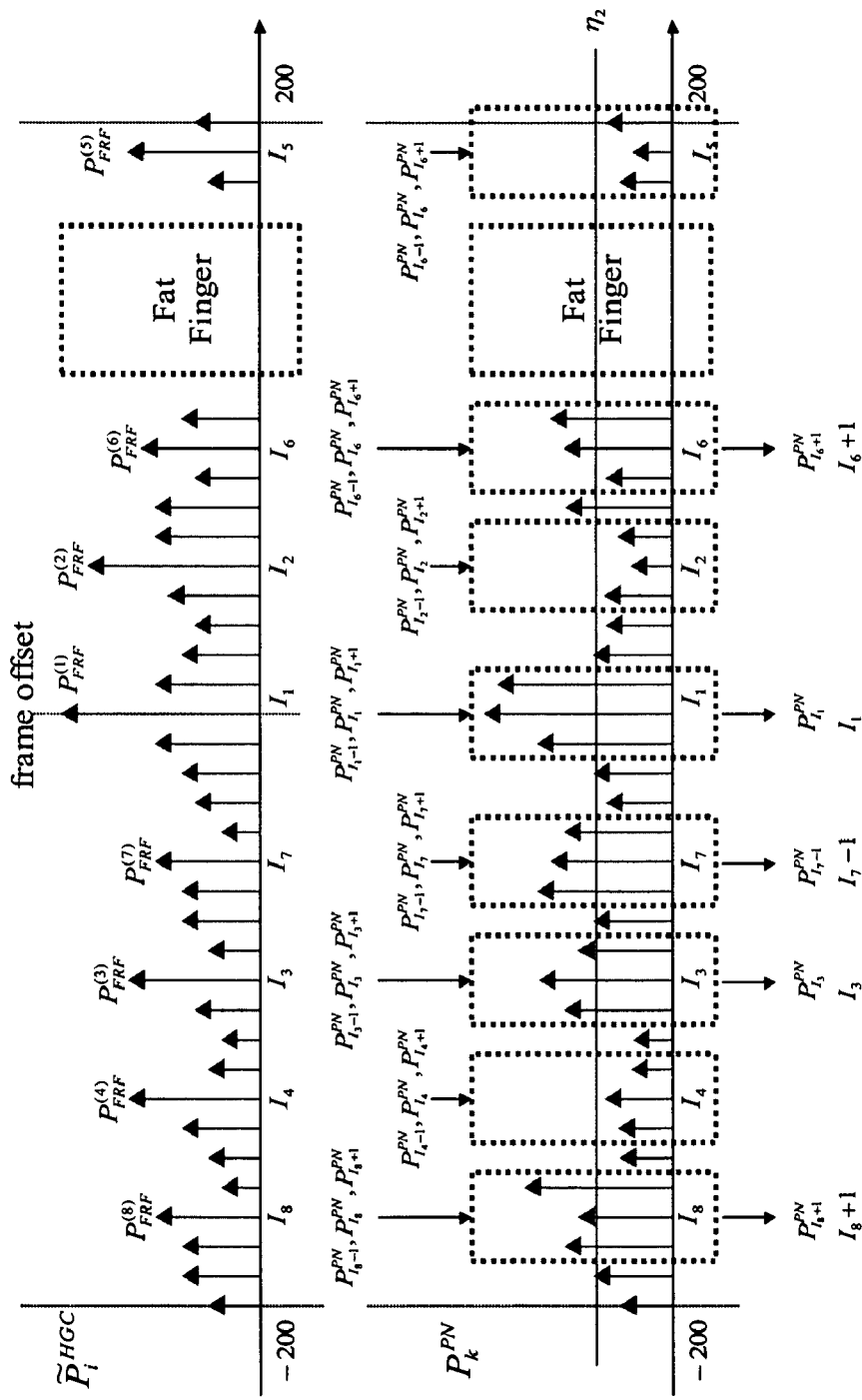
FIG. 10 is a graphical illustration of a RAKE finger detection block process.

If the correlation power in Equation (20) is greater than the second threshold $\eta_2$, (i.e., $P_k^{PN} \geq \eta_2$), the corresponding code phase is verified as a true path for the detected cell; otherwise the code phase is not verified as a true path. In the verification mode for post-detection, the adjacent code phases (left and right) of the given indices from Equation (18) are also tested to account for clock drift and vehicle motion. FIG. 10 shows the RAKE Finger Detection block process. The upper part illustrates the selection of the largest M samples, for example eight (8), and their indices, $[I_1, I_2, \ldots, I_8]$. The lower part illustrates the verification process that determines L true paths. The adjacent indices of $[I_1, I_2, \ldots, I_8]$ are:

$$[(I_1-1, I_1, I_1+1), (I_2-1, I_2, I_2+1), \ldots, (I_8-1, I_8, I_8+1)], \quad (22)$$

and their corresponding powers are:

$$[(P_{I_1-1}^{PN}, P_{I_1}^{PN}, P_{I_1+1}^{PN}), (P_{I_2-1}^{PN}, P_{I_2}^{PN}, P_{I_2+1}^{PN}), \ldots, (P_{I_8-1}^{PN}, P_{I_8}^{PN}, P_{I_8+1}^{PN})] \quad (23)$$

Preferably, the largest powers above the second threshold and their indices of each set in Equations (22) and (23) are selected as a true path. FIG. 10 illustrates the selection of the indices $$[I_8+1, I_3, I_7-1, I_1, I_6+1] \quad (24)$$

as each being verified as a true path in the illustrated example. In this case, L is found to be 5 since three of the eight sets in Equations (22) and (23) have no power above the second threshold.

The Second Rank Filter selects the largest K samples out of the L candidates where K is the number of RAKE fingers or L, if smaller. The input of this block is the correlation powers above the threshold and their indices. These powers are ranked in descending order:

$$P_1^{RAKE} \geq P_2^{RAKE} \geq \ldots \geq P_L^{RAKE} \quad (25)$$

and the corresponding indices from (24) are sorted in Equation (25) as:

$$[I_1^{RAKE}, I_2^{RAKE}, \ldots, I_L^{RAKE}]. \quad (26)$$

The output of this block is the indices of the K largest samples in Equation (26) which correspond to:

$$[I_1^{RAKE}, I_2^{RAKE}, \ldots, I_K^{RAKE}]. \quad (27)$$

Figure 11:
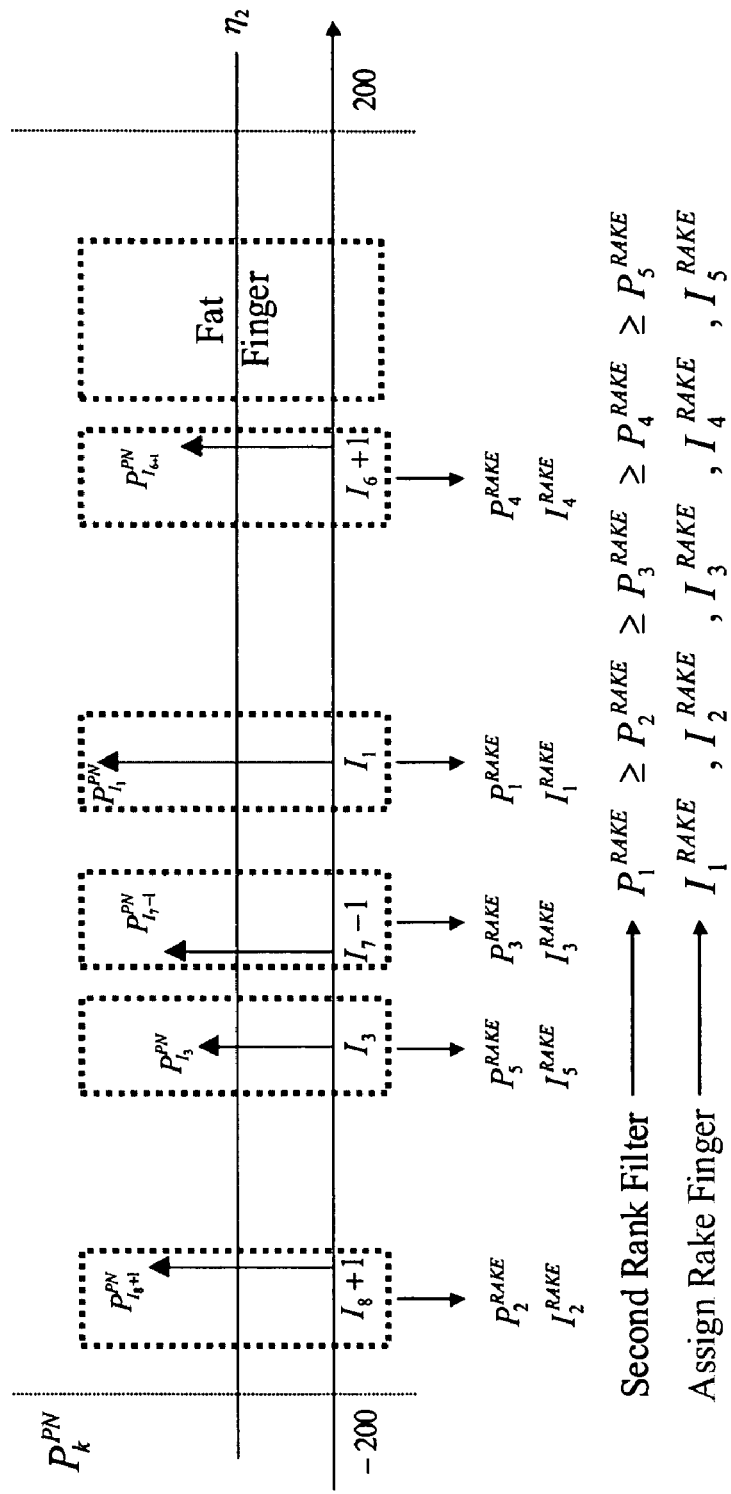
FIG. 11 is a graphical illustration of a second rank filter block process.

FIG. 11 illustrates the second rank filter block process. The correlation powers are ranked in descending order such that:

$$P_{I_1}^{PN} \geq P_{I_8+1}^{PN} \geq P_{I_7-1}^{PN} \geq P_{I_6+1}^{PN} \geq P_{I_3}^{PN} \Rightarrow P_1^{RAKE} \geq P_2^{RAKE} \geq P_3^{RAKE} \geq P_4^{RAKE} \geq P_5^{RAKE}.$$

The indices are also sorted in that order such that:

$$[I_1, I_8+1, I_7-1, I_6+1, I_3] \Rightarrow [I_1^{RAKE}, I_2^{RAKE}, I_3^{RAKE}, I_4^{RAKE}, I_5^{RAKE}]. \quad (28)$$

Finally, if K RAKE fingers are available in the receiver system, the K indices of Equation (28) are assigned as the RAKE fingers as set forth below. Less than K fingers may be available where a FAT finger has been assigned.

The largest RAKE finger path is always assigned to a RAKE receiver finger, even if it fails to meet the minimum criteria, unless there is a FAT finger assigned. If a RAKE finger, FAT or standard, is assigned, each additional finger path preferably must pass an additional test before being assigned to a RAKE receiver finger.

The additional test determines whether the added SNR exceeds some minimum $\Delta$ dB. If the current SNR after k fingers are assigned is $SNR_k$ dB, the additional finger is assigned if:

$$SNR_{k+1} - SNR_k \geq \Delta dB. \quad (29)$$

This is equivalent to comparing the measured linear power of the k+1 th component, $P_{k+1}$, to the cumulative power:

$$CP_k = \sum_{j=1}^{k} P_j. \quad (30)$$

If $P_{k+1} \geq (\delta-1)CP_k$, then the finger is assigned. Here, $\delta = 10^{0.1\Delta}$. For example, if $\delta = 1/16$, then $\Delta = 0.26$ dB. In that case another RAKE receiver finger is assigned only if a component adds an additional 0.26 dB to the total SNR.

A typical radio propagation channel contains reflections caused by buildings, mountains, and mobile obstacles in the propagation path. These multiple paths generate attenuation and distortion of the signal energy. The delay profile extends typically from 1 to 2 µs in urban and suburban areas, although in some cases delays as long as 20 µs or more with significant signal energy have been observed in mountainous regions. If the time difference of the multi-path components is at least 0.26 µs (chip duration), the CDMA RAKE receiver can separate those multi-path components and combine them coherently to obtain diversity. The 0.26 µs delay can be obtained if the difference in path lengths is at least 260 ft. The received signal power can drop considerably when phase cancellation of multi-path reflection occurs. Because of the underlying geometry causing the fading and dispersion phenomena, signal variations due to fast fading occur several orders of magnitude more frequently than changes in the average multi-path delay profile.

There are several techniques to overcome this fading. The first technique is using RAKE fingers allocated to those delay positions on which significant energy arrives. The second technique is fast power control and diversity reception. The third technique is coding and interleaving.

Figure 12:
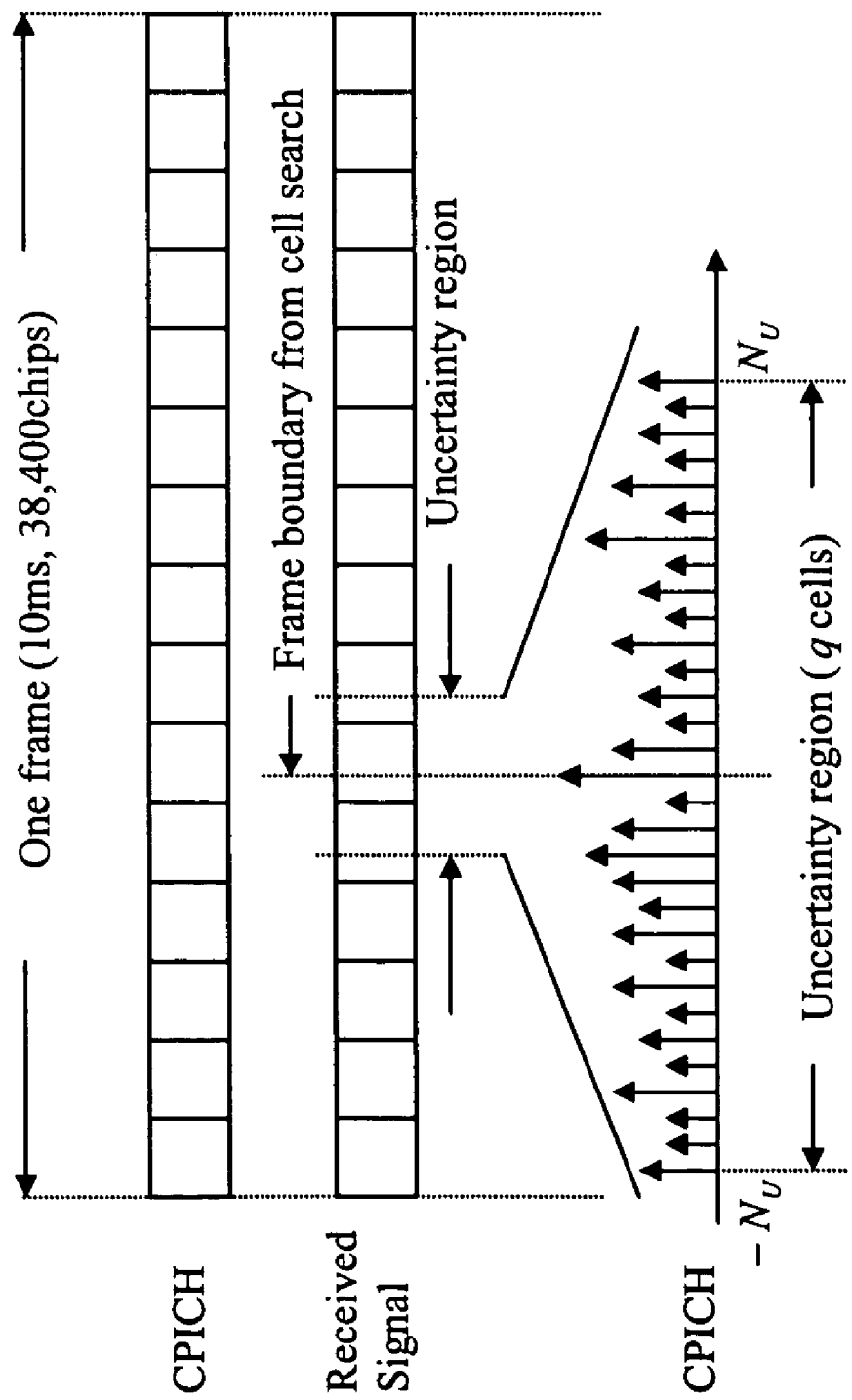
FIG. 12 is an illustration of a post-detection structure.

The outputs of the FAT finger allocation and RAKE finger allocation processors are used to improve overall system performance. For example, the average acquisition times depend on the detection probability, false alarm probability, the dwell time, the false alarm penalty time and the number of cells to search. Since the average acquisition time is very important for the performance of the acquisition device, it is desirable to optimize all the above parameters. FIG. 12 shows the post-detection structure for obtaining cross-correlation power between the PN scrambling sequence and the received signal in the neighborhood of the frame boundary.

In the absence of any a priori information regarding the true code phase position, the uncertainty in misalignment between the received PN code and the local replica of it could be as much as a full code period. Thus, for long PN codes the corresponding time uncertainty to be resolved could typically be quite large. It is typical in practice to require that the received and local PN code signals be aligned to within one-half chip period $T_c/2$ before relinquishing control to the fine synchronization tracking system. In accordance with this requirement, the time delay of the local PN code signal would be retarded or advanced in discrete steps. Thus, if $T_U = N_U T_c$ is the time uncertainty to be resolved, then $q = 2N_U + 1$ is the number of possible code alignments which, in serial search parlance, are referred to as cells to be examined during each search through the uncertainty region.

The goal of code acquisition is to achieve a coarse time alignment between the received pseudo noise (PN) code r(m,n) and the locally generated code c(m,n) to an accuracy of a fraction of one PN sequence chip. A popular approach to code acquisition is the serial search techniques, which correlate the received and locally generated code sequences and then test the synchronization based on either the crossing of a threshold or the maximum correlation. A threshold value is determined depending on the signal-to-noise ratio of the matched-filter output, and it may be adjusted according to either the noise power or the partial correlation. A search technique employs both the maximum criterion as well as the threshold-crossing criterion. The parameters in this analysis are the following:

$P_D$: Probability of detection when the correct bin is tested
$P_{FA}$: Probability of false alarm when an incorrect bin is tested
$\tau_d$: Dwell time (Integration time) in each cell
K: The number of dwell penalty time units
q: Total number of cells to be searched
The mean acquisition time $\overline{T}_{ACQ}$ is:

$$\overline{T}_{ACQ} = \frac{2 + (2 - P_D)(q-1)(1 + KP_{FA})}{2P_D} \tau_d \quad (31)$$

where the average dwell time is given by:

$$\tau_d = JT_s = 256 \times JT_c. \quad (32)$$

If 5 slots are used (J=50), then, $\tau_d = 3.3$ ms. The formula for mean acquisition time in Equation (31) is a function of the probability of detection $P_D$, probability of false alarm $P_F$ and dwell time $\tau_d$. For a high probability of detection $P_D$ and the low probability of false alarm $P_F$:

$$\overline{T}_{ACQ} \approx \frac{(q-1)}{2} \tau_d. \quad (33)$$

Since q-1=400, we find $\overline{T}_{ACQ} \approx 0.66$ sec, where (33) is obtained from (31) by approximating as follows: $P_{FA} \approx 0$, $P_D \approx 1$, q is much greater than 1.

In many practical code acquisition systems, the reduction of the false alarm probability for a given overall acquisition time involves the use of search techniques in conjunction with a verification algorithm. The verification process alternates with the search process and is started whenever an acquisition is declared. The search is then placed on hold during verification algorithm. A system that employs both search and verification is called a double-dwell system. When properly employed, a double-dwell search strategy may result in significant speed-up of the overall search process. A speed-up of approximately a factor of 3 has been observed in simulation.

Figure 13:
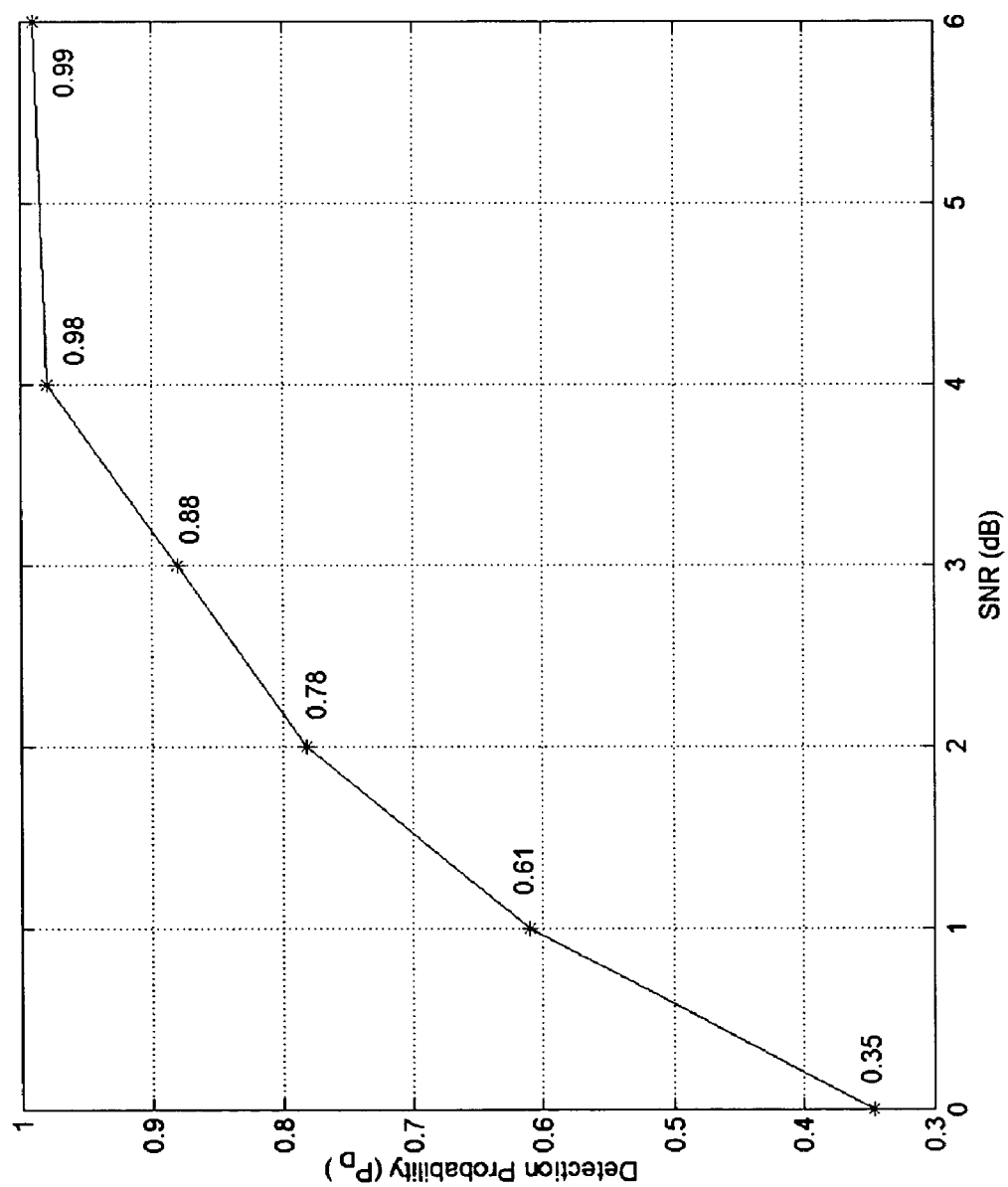
FIG. 13 is a graph of detection probability ($P_D$) of a single path case in an AWGN channel with various SNRs.

FIG. 13 shows the detection probability $P_D$ of the single path in the AWGN channel with respect to the various SNR.

If the input SNR exceeds 4 dB, the detection probability is almost 1.0. To get the same performance in a multi-path fading channel, the input SNR must increase up to 15 dB–20 dB.

Figure 14:
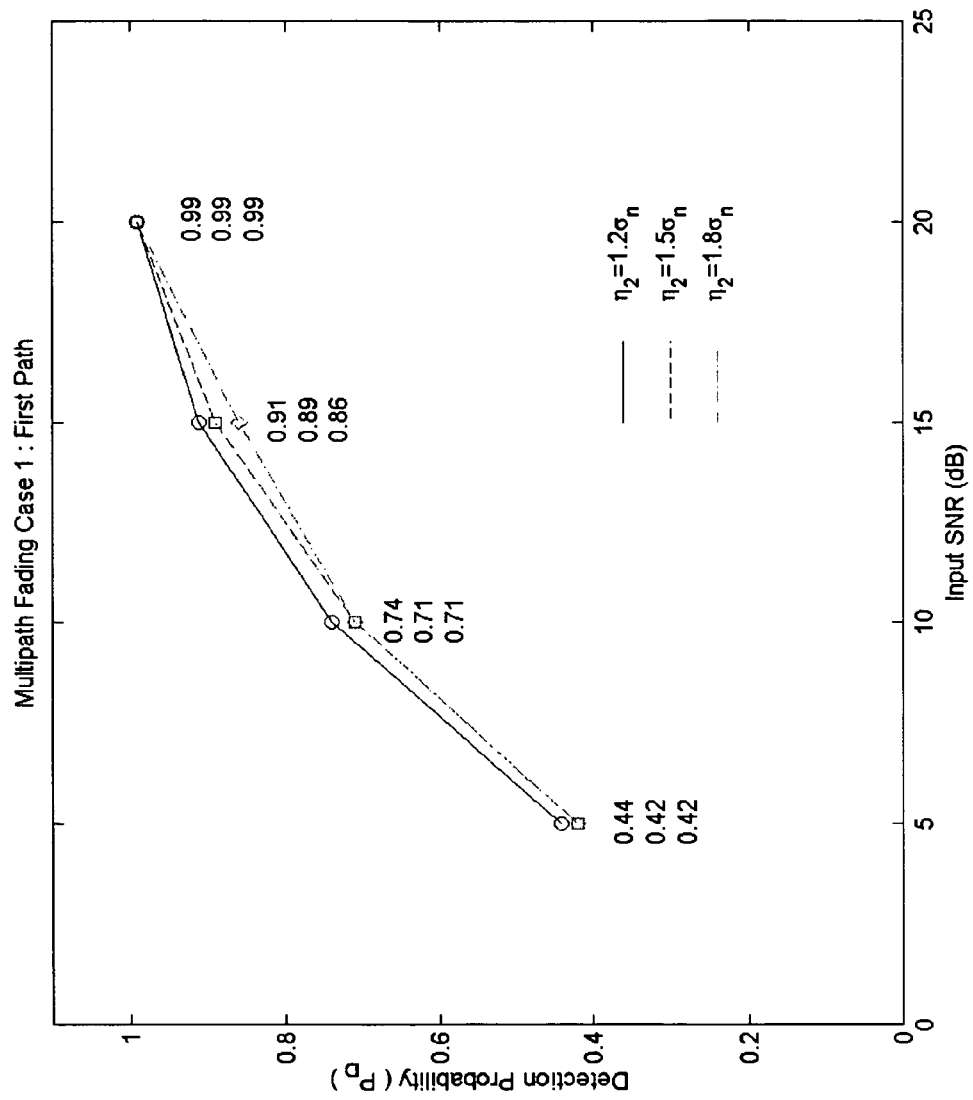
FIG. 14 is a graph of detection probability ($P_D$) of a first path in a multi-path fading channel (Case 1) with various SNR and a second threshold $\eta_2$.

FIG. 14 shows the detection probability of the first path in the multi-path fading channel for WG4 Case 1, wherein there are two paths with 0 and −10 dB Rayleigh-fading amplitudes at 3 km/h speed. The input SNR must be increased up to 20 dB to get similar performance compared to FIG. 13. For the first path the detection probability is not much different with respect to the second threshold $\eta_2$.

Figure 15:
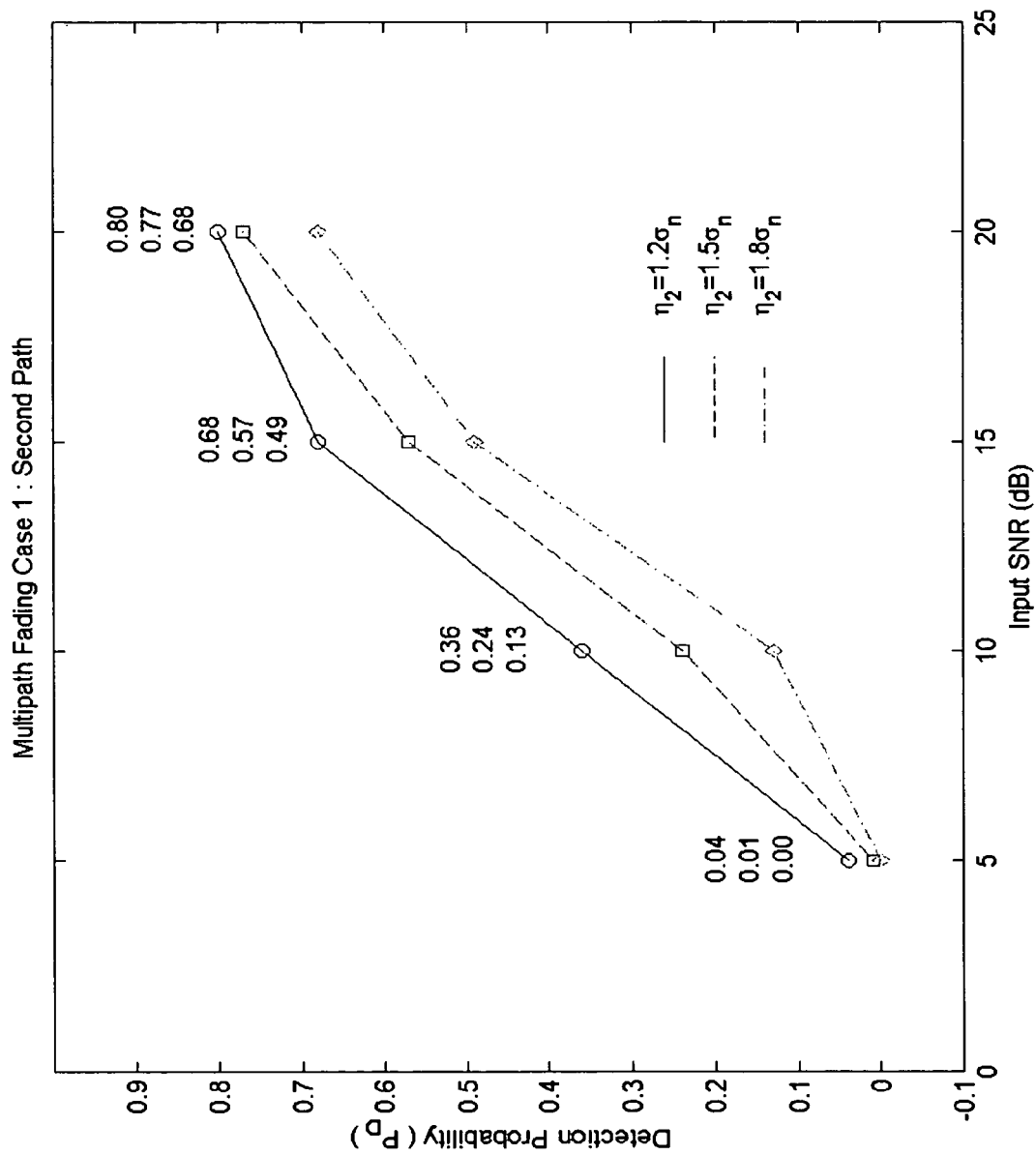
FIG. 15 is a graph of detection probability ($P_D$) of a second path in the multi-path fading channel (Case 1) with various SNR and the second threshold $\eta_2$.

FIG. 15 shows the detection probability of the second path in the multi-path fading channel. If the second threshold $\eta_2$ is low, there is a better detection probability. For example, if input SNR is 10 dB, then the difference of detection probability is 0.23 (23%) when the second threshold varies from $\eta_2=1.2\sigma_n^{PN}$ to $\eta_2=1.8\sigma_n^{PN}$.

Figure 16:
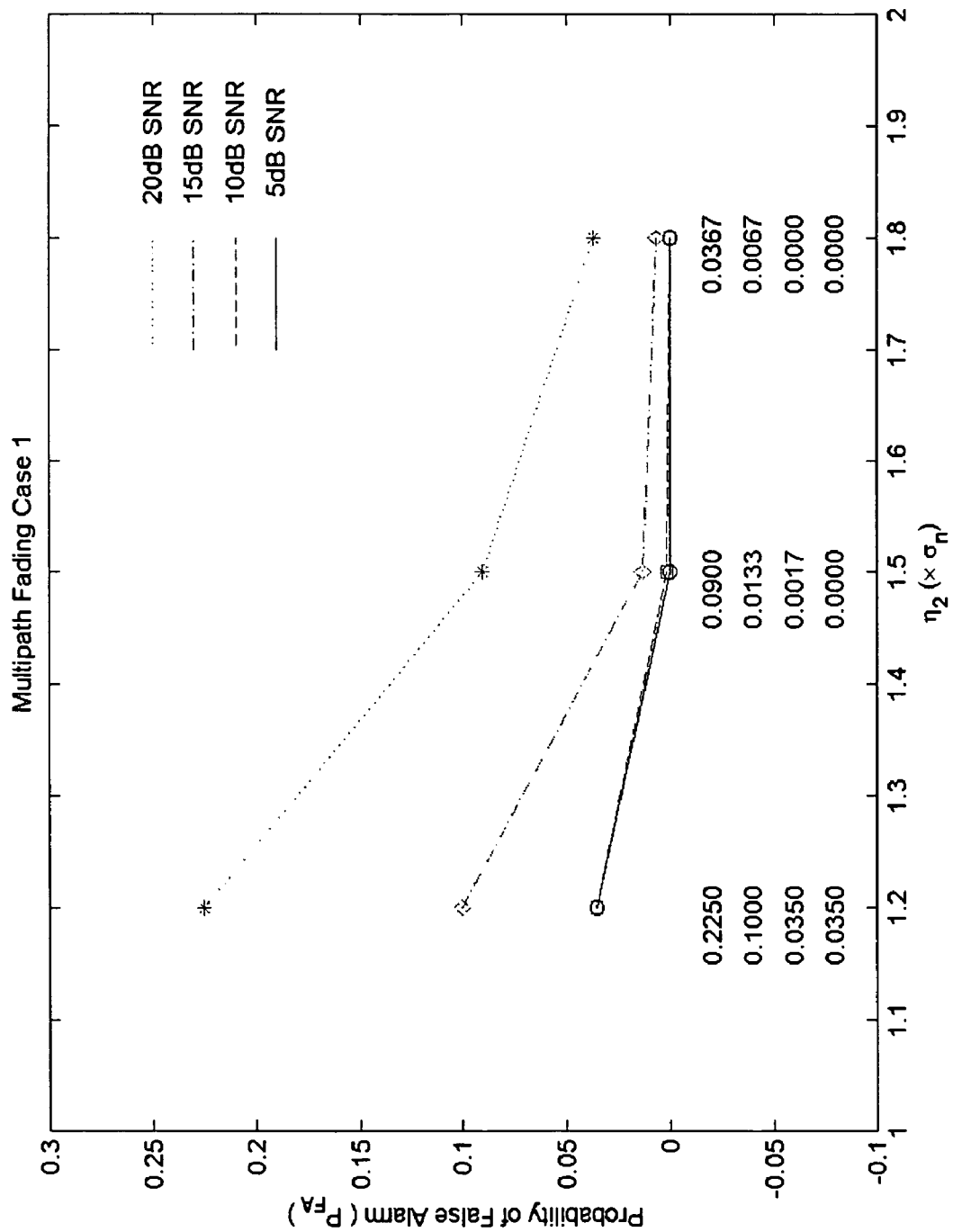
FIG. 16 is graph of probability of false alarm ($P_{FA}$) with respect to the second threshold $\eta_2$.

FIG. 16 shows the probability of false alarm ($P_{FA}$) with respect to the second threshold $\eta_2$. It is obvious that if the second threshold is increased, the probability of false alarm decreases.

There is a trade-off between the probability of false alarm and the detection probability which is controlled by the second threshold. If the second threshold is decreasing, the probability of false alarm and the detection probability are both increasing especially for the second path, and vice versa. FIG. 16 also shows that if input SNR is high enough, then the second threshold should be adjusted to a high enough value to get a low probability of false alarm.

Figure 17:
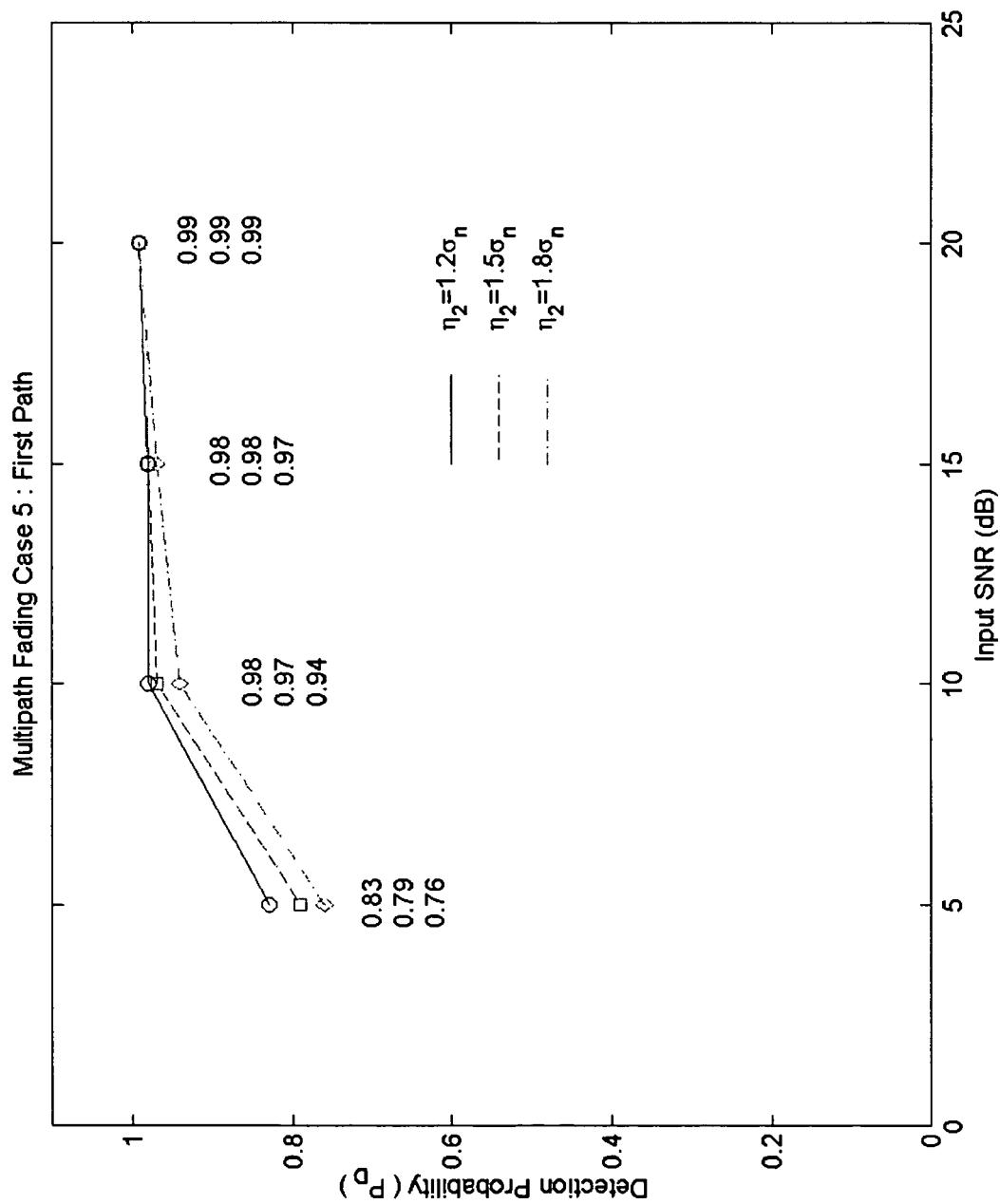
FIG. 17 is a graph of the detection probability ($P_D$) of a first path in a multi-path fading channel (Case 5) with the various SNR and the second threshold $\eta_2$.

FIG. 17 shows the detection probability of the first path with various SNR and the second threshold $\eta_2$, for multi-path fading channel Case 5 wherein there are two paths with 0 and −10 dB Rayleigh-fading amplitudes at 50 km/h speed. Compared to Case 1 (FIG. 14), the detection probability is increased from 0.44 to 0.83 with the second threshold $\eta_2=1.2\sigma_n$ and 5 dB input SNR. Notice that the detection probability is almost doubled when the speed is increased from 3 km/h to 50 km/h. When the input SNR is higher than 10 dB, the detection probabilities are more than 90%.

Figure 18:
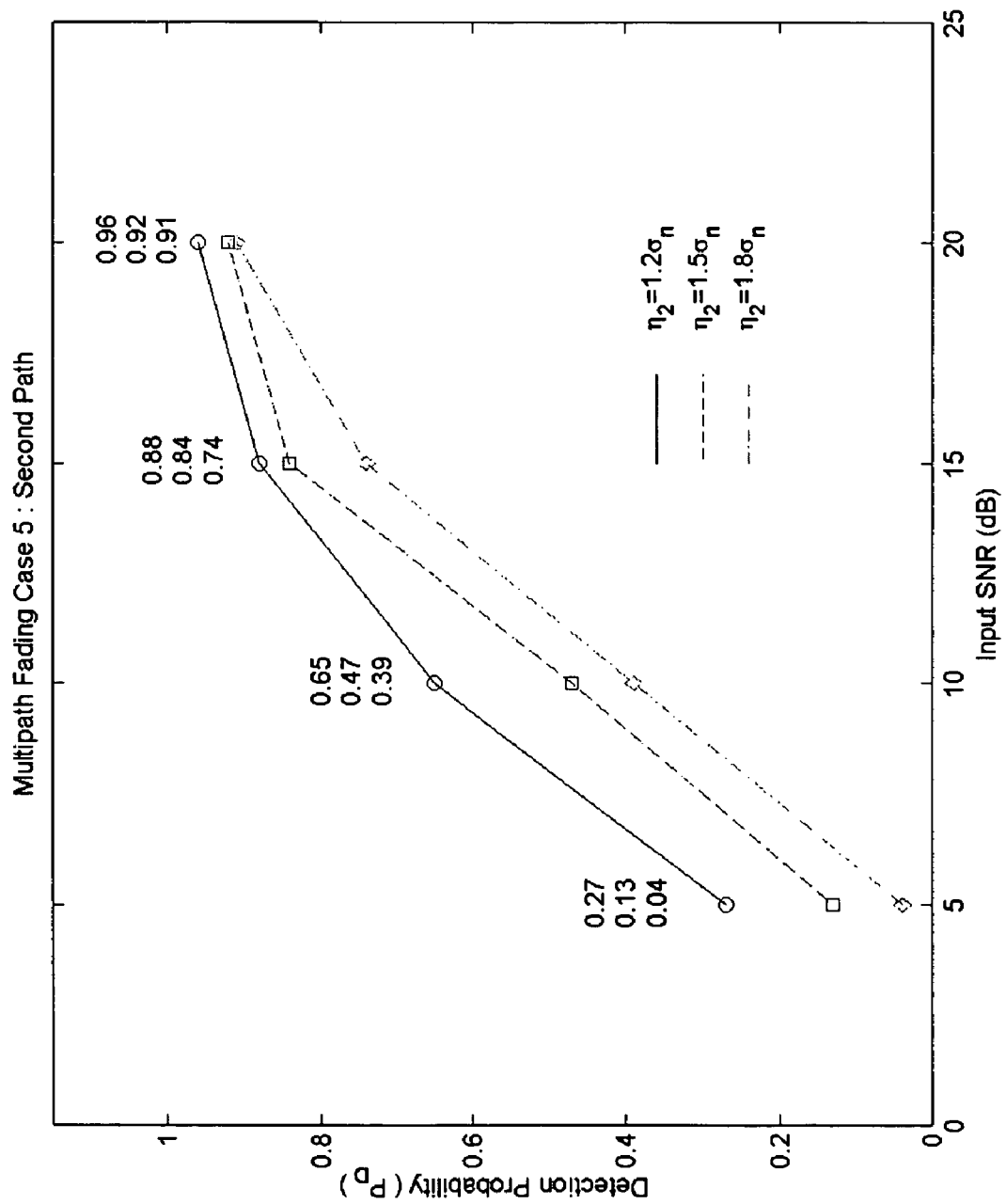
FIG. 18 is a graph of detection probability ($P_D$) of a second path in the multi-path fading channel (Case 5) with various SNR and the second threshold $\eta_2$.

FIG. 18 shows the detection probability of the second path (−10 dB amplitude). Compare to Case 1 (FIG. 15), the detection probability is increased from 0.04 to 0.27 with the second threshold $\eta_2=1.2\sigma_n$ and 5 dB input SNR. Generally, the simulation results show that the detection probability is increased as the speed is increased.

To detect the second path more than 90% in any threshold, the input SNR should be around 20 dB. With low input SNR, the detection probability highly depends on the second threshold. The detection probabilities are 0.27, 0.13, and 0.04 with the second threshold $\eta_2=1.2\sigma_n$, $\eta_2=1.5\sigma_n$, and $\eta_2=1.8\sigma_n$, respectively.

Figure 19:
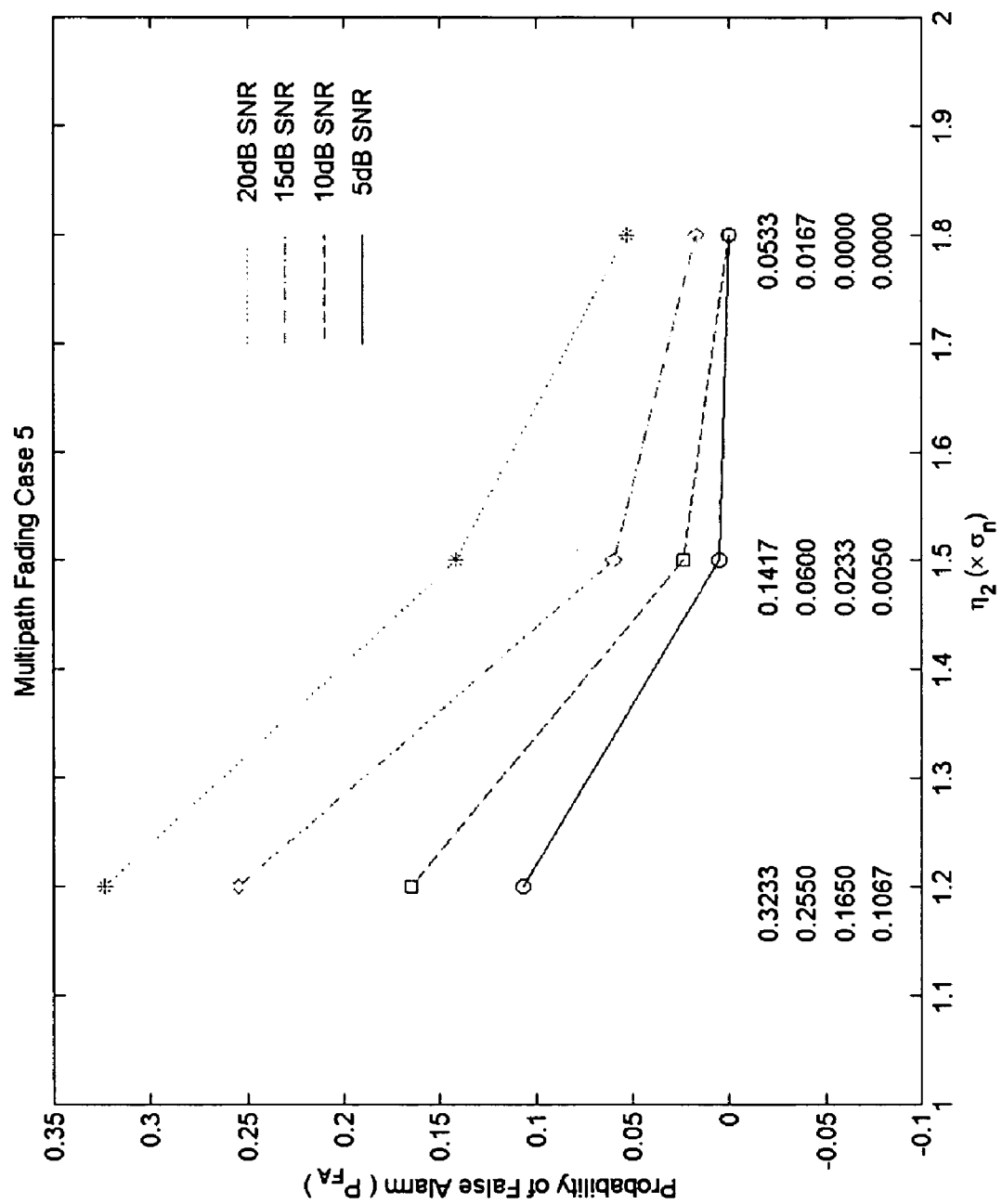
FIG. 19 is a graph of probability of false alarm ($P_{FA}$) with respect to the second threshold $\eta_2$.

FIG. 19 shows the probability of false alarm with respect to the second threshold $\eta_2$. Compared to the Case 1 (FIG. 16), overall false alarm rates are increased. For example, the false alarm rate is changed from 0.2250 to 0.3233 with the second threshold $\eta_2=1.2\sigma_n$ and 20 dB input SNR. It is obvious that the threshold $\eta_2$ should be high enough to get a low probability of false alarm.

The probability of detection is improved when the speed is increased. However, the probability of false alarm is increased when the speed is increased with otherwise the same conditions. The second threshold $\eta_2$ is preferably selected to maximize the detection probability and to minimize the probability of false alarm. The proper strategy between the probability of detection and the probability of false alarm is selected to optimize the performance of the receiver system.

In order to alleviate the problem of paths disappearing or not being detected by the RAKE location process above, the present invention preferably utilizes a RAKE relocation process. However, if the FAT finger path disappears or if no FAT finger has been assigned, the RAKE location process is preferably conducted again after a selected time interval.

Figure 20:
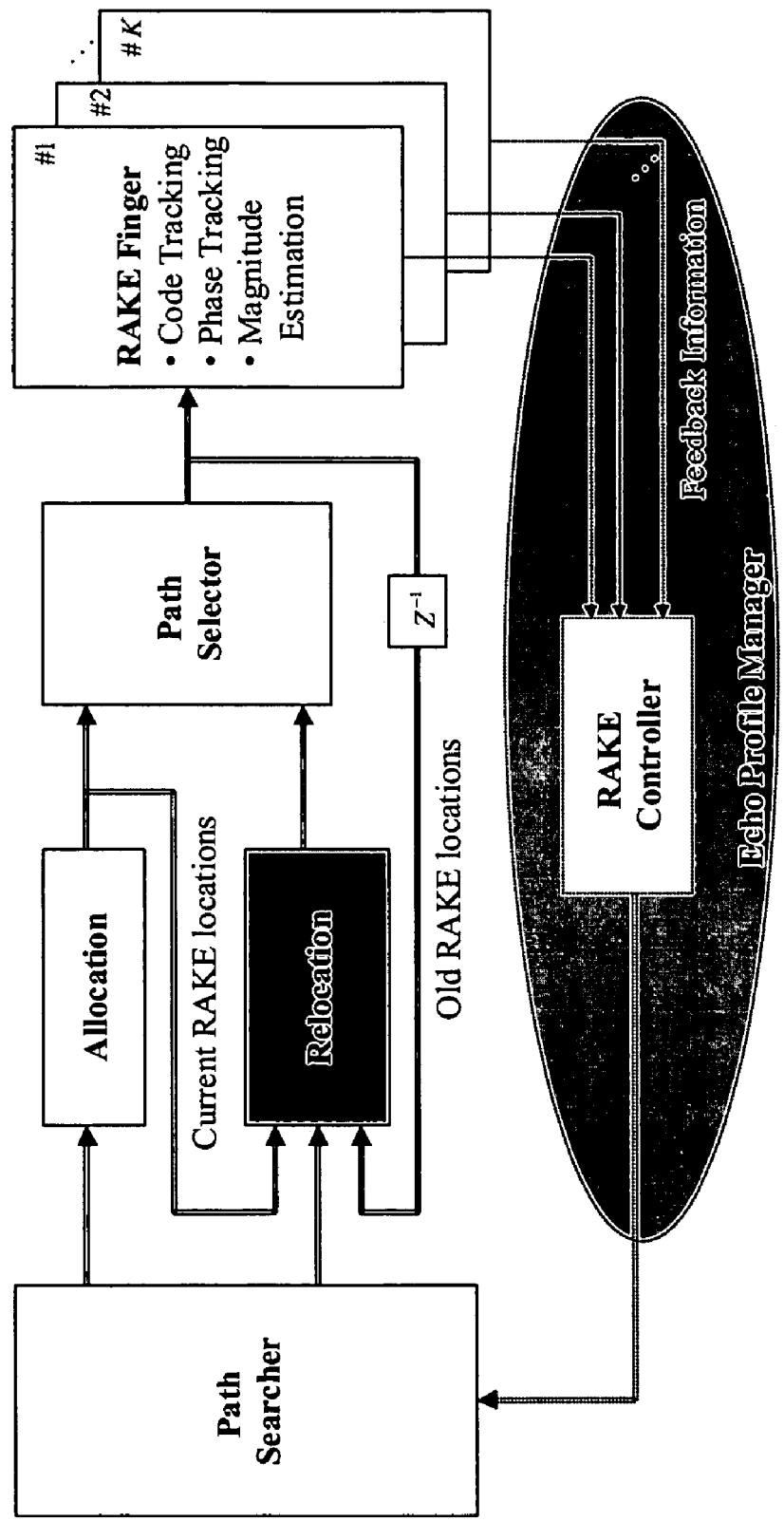
FIG. 20 is a block diagram of a RAKE management structure.

A RAKE management system implements the relocation process and comprises the following processors: Path Searcher, Allocation, Relocation, Path Selector and RAKE Controller. FIG. 20 shows the overall RAKE management system structure.

Figure 21:
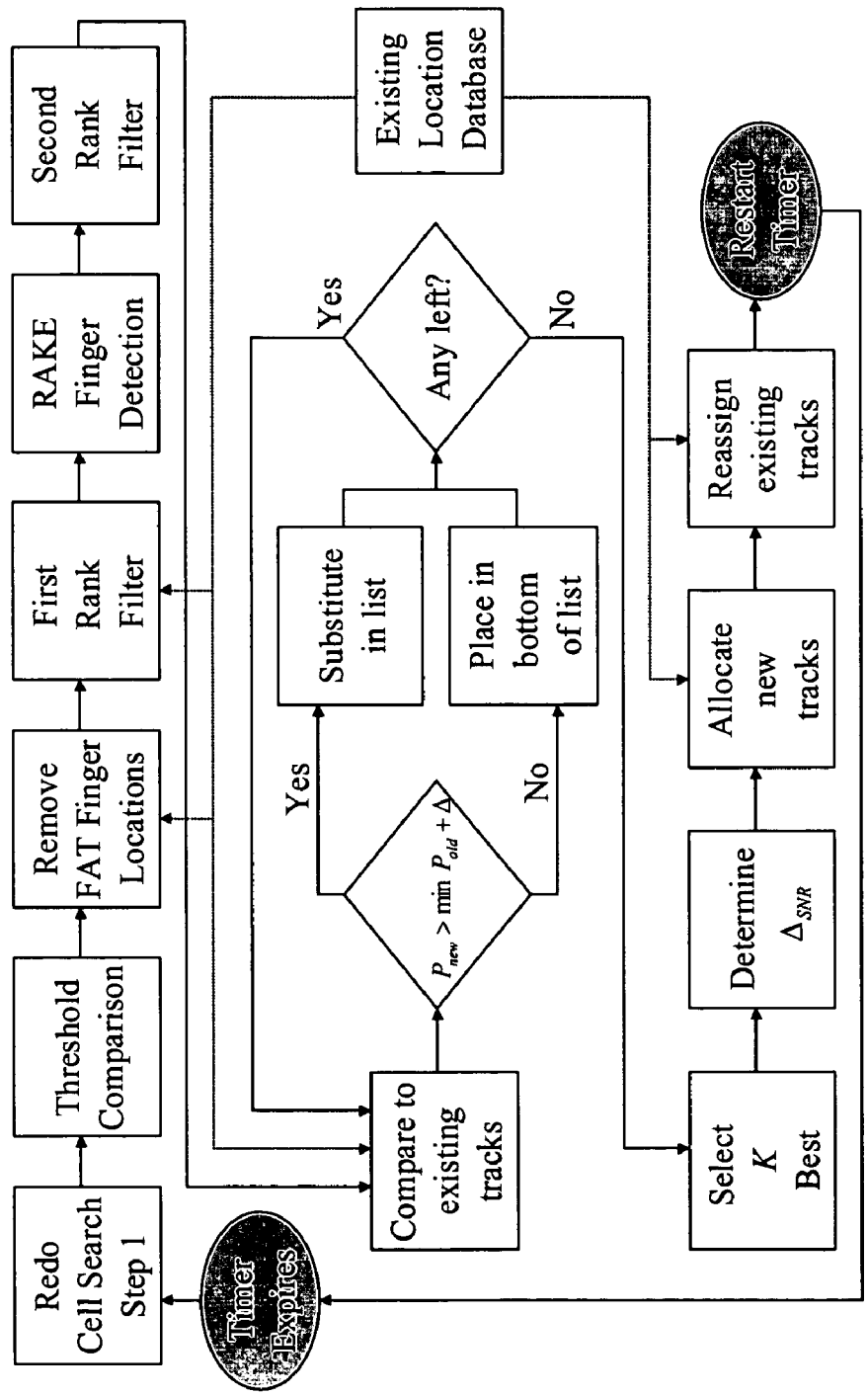
FIG. 21 is a RAKE relocation flowchart.

The RAKE Relocation process shown in FIG. 21, is used to reselect the path candidates and compare the path candidates with the existing paths. Then, if the powers of the candidates are greater than the powers of the existing tracks, the current paths are de-allocated and the new paths are reassigned to the RAKE finger.

The power delay profiles can be found by using the Hierarchical Golay Correlator (HGC) outputs from the Cell Search step 1. The Threshold Comparison block removes the noise components of the HGC outputs. The current FAT and RAKE finger locations are excluded from the Path Search process. Then, the HGC outputs except the current FAT and RAKE finger locations are ranked in descending order. Finally, the largest paths, separated by at least 2 samples, are selected as new path candidates.

The primary synchronization code (PSC) is an unmodulated Golay sequence of length 256 chips, repeated with a period of one slot. By detecting the PSC, the User Equipment (UE) acquires slot synchronization to the target base station.

The path search procedures are as follows:
Step 1: Redo Cell Search Step 1
Step 2: Detect $\tilde{P}_i^{HGC}$ above the first threshold
Step 3: Exclude the current RAKE locations
Step 4: Exclude the current FAT finger locations
Step 5: Rank $\tilde{P}_i^{HGC}$ in descending order
Step 6: Find the new candidate list
Step 7: Find the disappeared paths by comparing the old and new RAKE locations
Step 8: Finalize the candidate list (the new candidate list and the disappeared paths).

Figure 22:
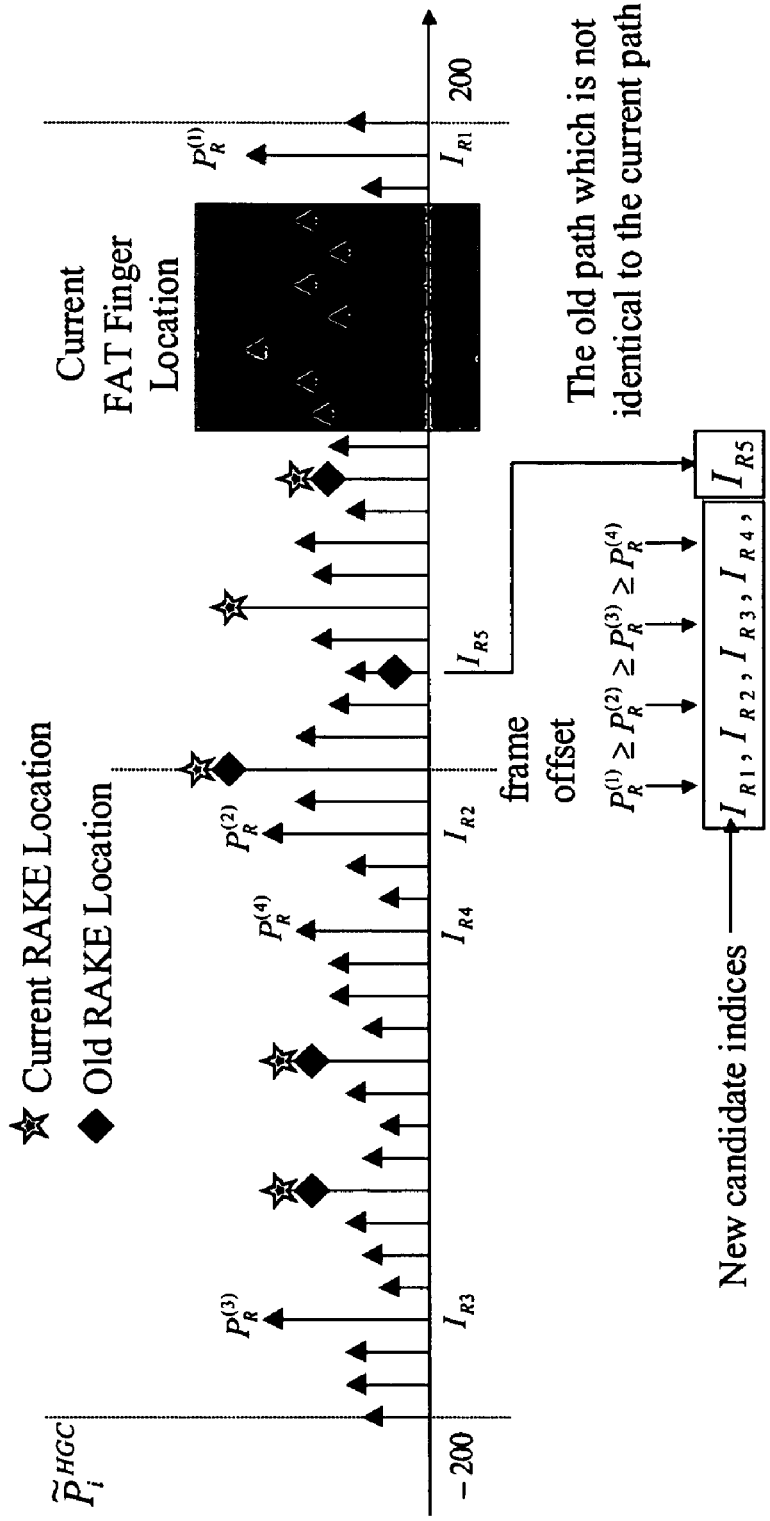
FIG. 22 is a graphical illustration of a path search process.

FIG. 22 describes the path search process. The 'star' and 'diamond' represent the current and old RAKE locations respectively. The shaded region indicates the current FAT finger location. The current FAT and RAKE locations are excluded in the search process for the new path candidates. The HGC output powers are ranked in descending order and the largest paths are selected as the candidates. In addition, the disappeared paths are detected by comparing the old and current paths. The disappeared paths are also included as the path candidates because they may be present. Finally, five candidates are selected in the path search process.

Figure 23:
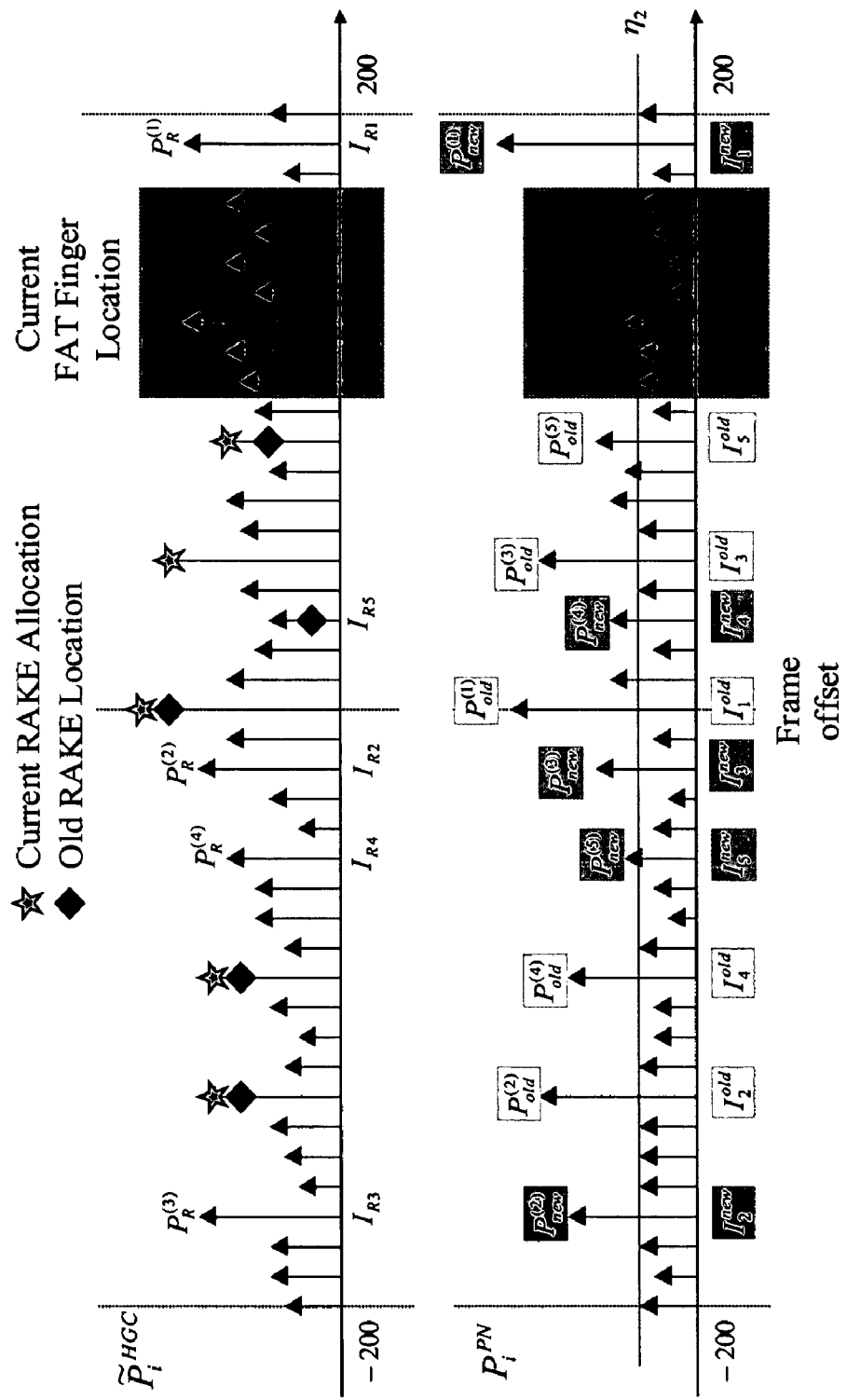
FIG. 23 is a graphical illustration of a path verification process.

The path candidates selected in the search process should be verified. To verify the paths, the correlation powers of the corresponding code phases are obtained by the symbol-by-symbol integration between the received signal and the Common Pilot Channel (CPICH). If the correlation power is greater than the second threshold, then the corresponding code phase is considered as a true path. Path Verification Procedures are as follows:

Step 1: Measure the correlation powers, $P_i^{PN}$, of the new candidates using CPICH Step 2: Detect $P_i^{PN}$ above the second threshold Step 3: Rank them in descending order Step 4: Select the largest paths The path verification process is illustrated in FIG. 23. The top row shows the search process and the bottom row shows the verification process. In the bottom row, there are new detected paths and old detected paths. The powers and their indices are sent to the Path Selector to rank them in descending order. Finally, the largest paths are reassigned to the RAKE fingers.

The computed correlation powers in the verification process are more reliable than the HGC correlation outputs since the former is computed with 15-symbol integration but later is computed with 50-symbol integration in a frame.

Figure 24:
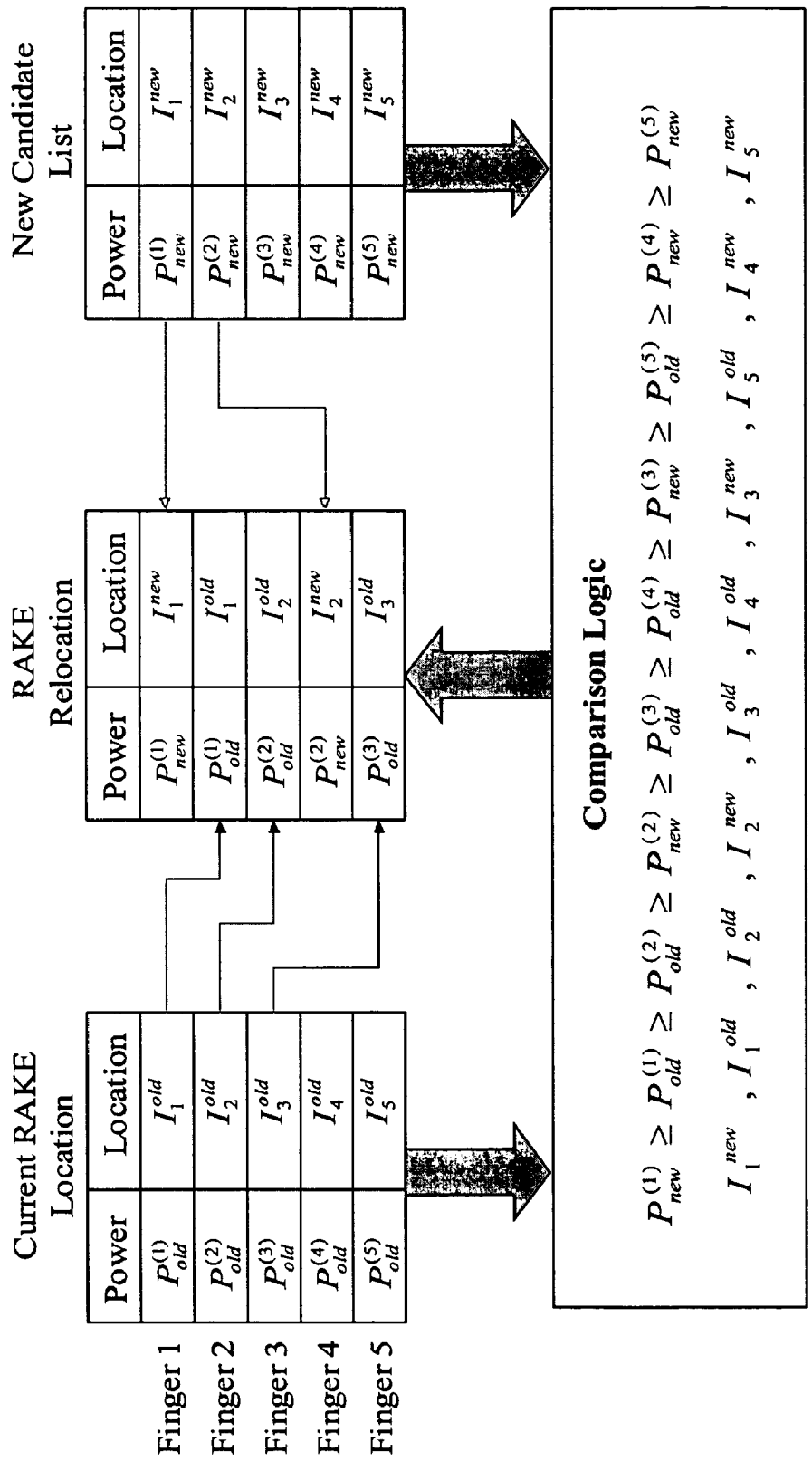
FIG. 24 is an illustration of a path selector process.

After comparing the powers of the current paths and the new path candidates, the largest paths are reselected and reassigned to the RAKE fingers. The path selector process is disclosed in FIG. 24. Three current paths are assigned at the $2^{nd}$, $3^{rd}$, and $5^{th}$ RAKE fingers. The $4^{th}$ and $5^{th}$ of the current paths are de-allocated. Two new path candidates are assigned at the $1^{st}$ and $4^{th}$ RAKE fingers. The $3^{rd}$, $4^{th}$, and $5^{th}$ of the new path candidates are not used.

Consider the situation where two paths are assigned to two separate RAKE fingers. Suppose that after some time the two fingers converged to the same location. In such a case the RAKE controller needs to discard one of the paths, free up the RAKE finger allocated to that path, inform the controller that a new finger has freed up, and instruct the path searcher to find a new path to be assigned. The RAKE controller should be aware of the activity of every finger and control the overall RAKE receiver, including the fingers.

Figure 25:
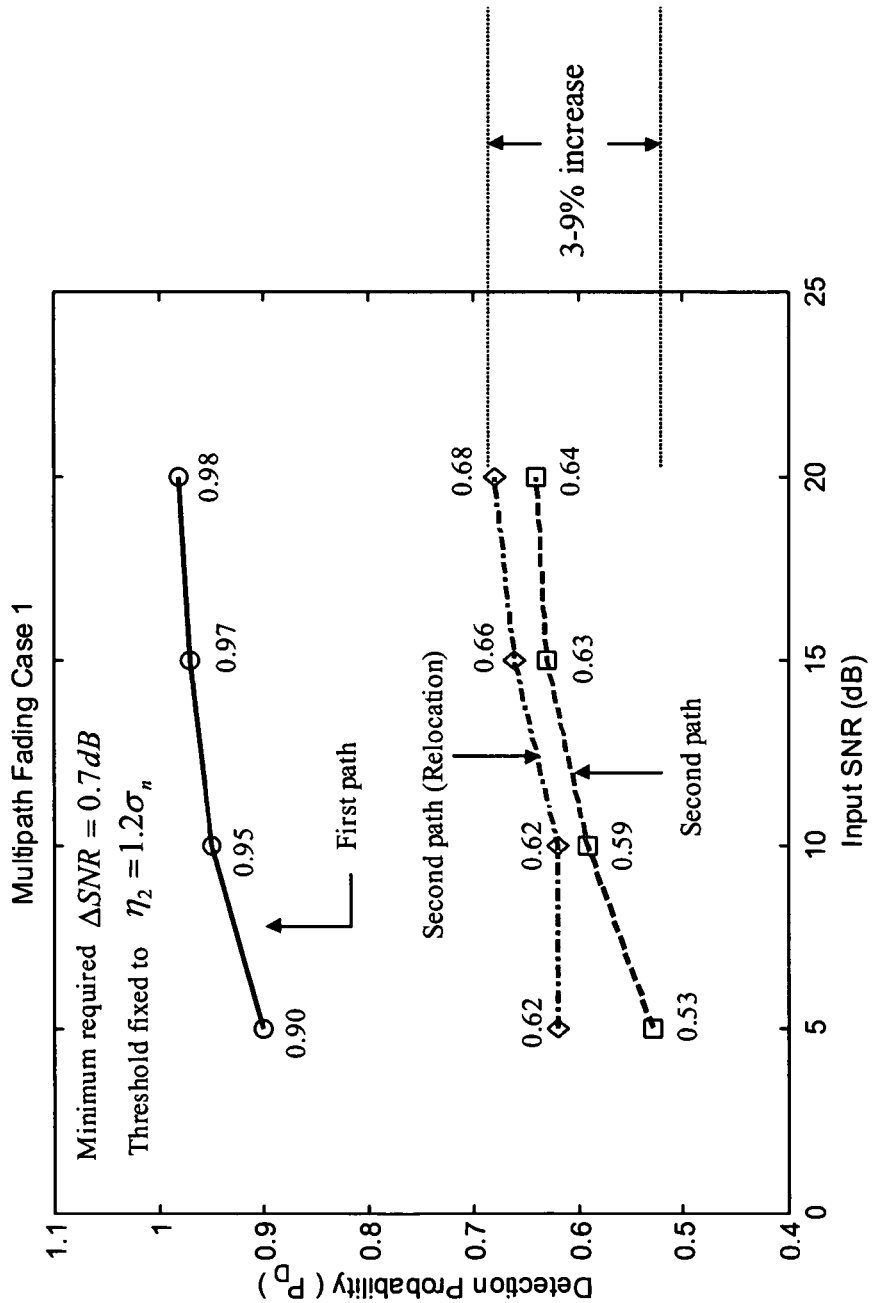
FIG. 25 is a graph of probability of detection for multi-path fading (Case 1).

FIG. 25 shows the probability of detection performance of Case 1 (Slow Moving Channel: 3 km/h) with various values of input SNR. The solid line with circles represents the detection performance of the first path in the RAKE allocation process. The dashed line with rectangles represents the detection performance of the second path in the RAKE allocation process. The dash-dotted line with diamonds represents the detection performance of the second path after Relocation process. The detection performance is increased by 3–9%. This implies that in the event the second path is lost in the RAKE allocation process, the RAKE Relocation process is often able to recover it.

Figure 26:
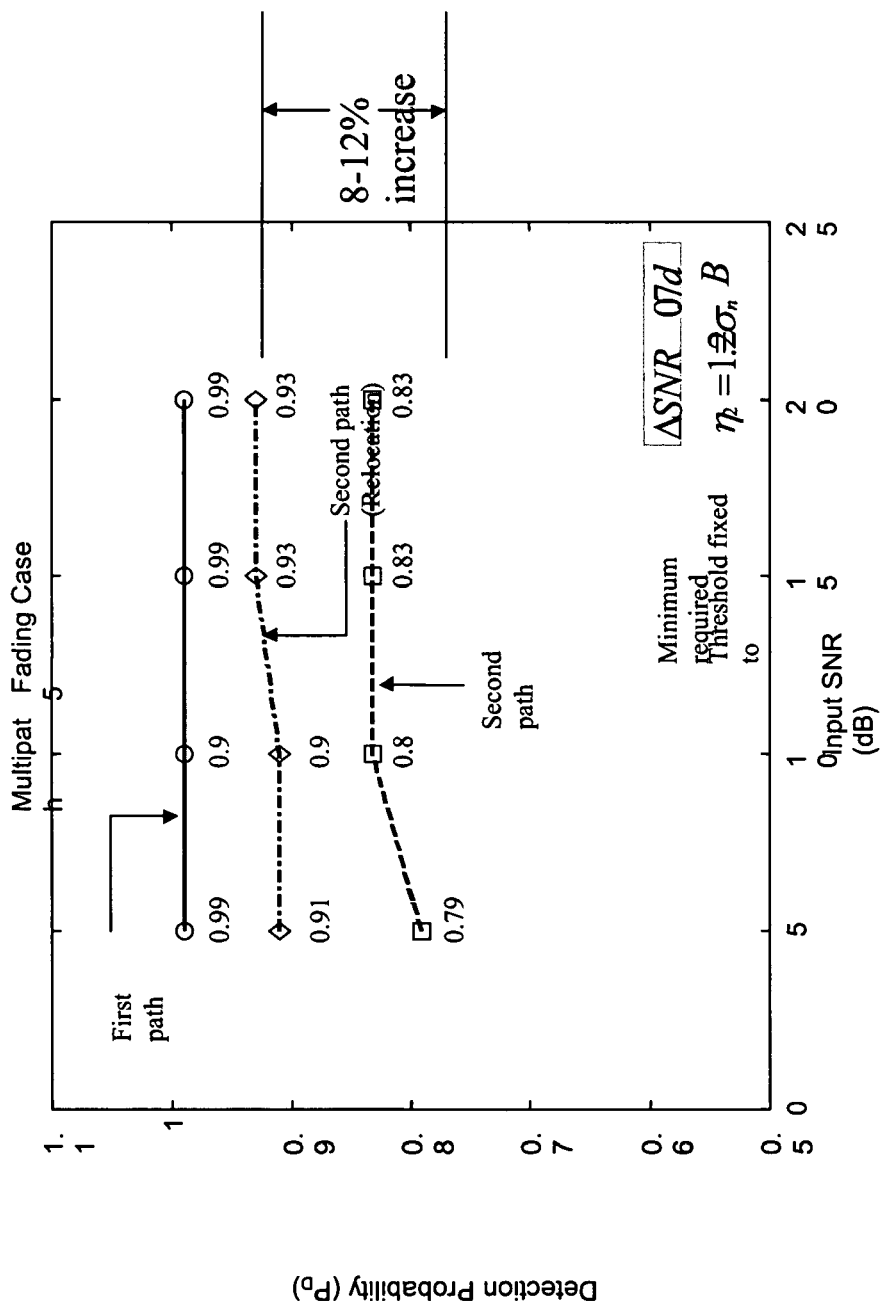
FIG. 26 is a graph of the probability of detection multi-path fading (Case 1).

FIG. 26 shows the probability of detection performance of Case 5 (Fast Moving Channel: 50 km/h) with various values of input SNR. The solid line with circles represents the detection performance of the first path in the RAKE allocation process. The dashed line with rectangles represents the detection performance of the second path in the RAKE allocation process. The dash-dotted line with diamonds represents the detection performance of the second path after Relocation process. The detection performance is increased by 8–12%. The simulation results show that the RAKE Relocation works better in the fast moving channel. This illustrates that the RAKE Relocation significantly helps to recover a lost path in the fast moving channel.

Figure 27:
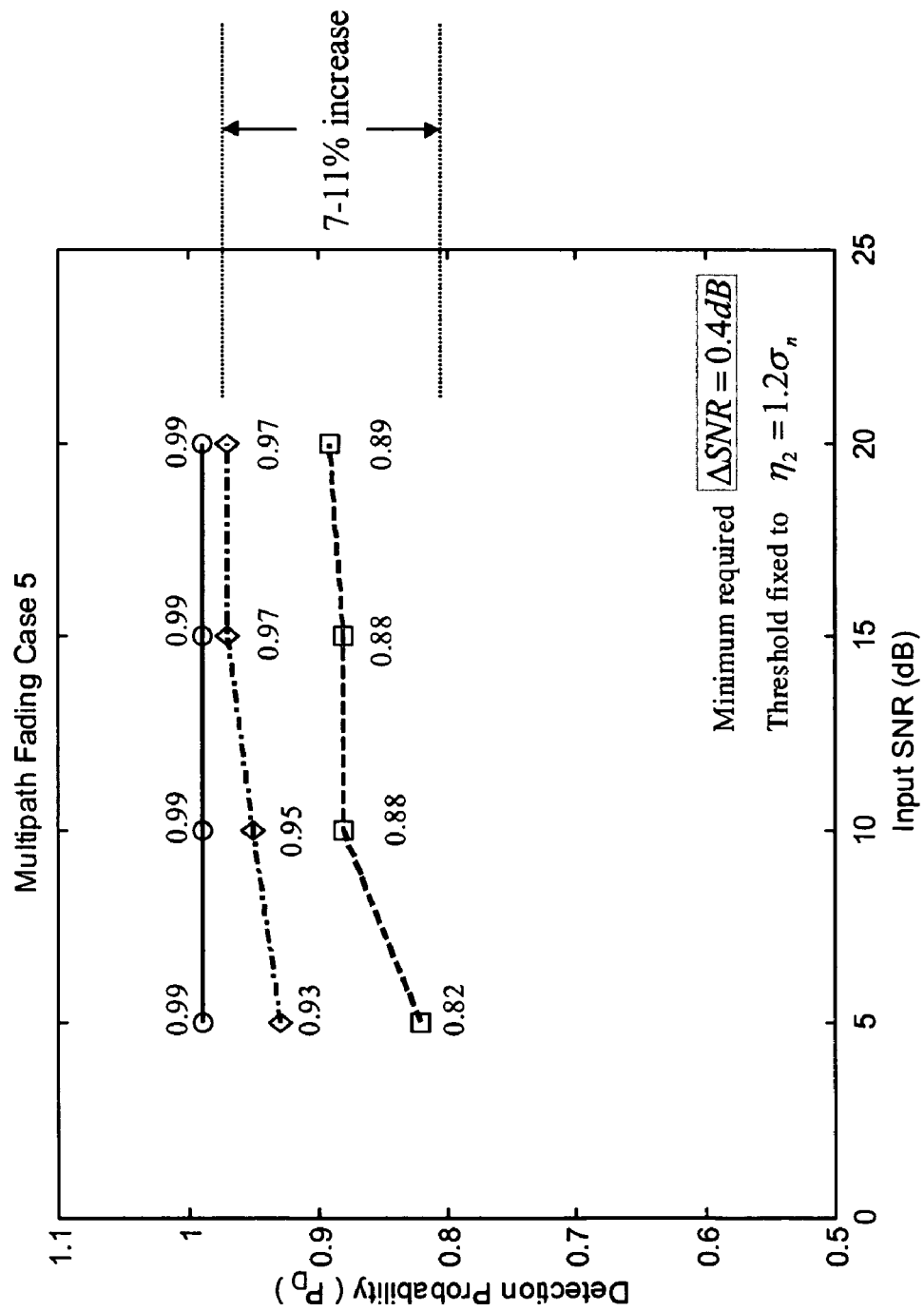
FIG. 27 is a graph of the probability of detection multi-path fading (Case 1).

FIG. 27 shows the probability of detection performance of Case 5 with various values of input SNR. Here, the minimum required ΔSNR is 0.4 dB. The detection performance of the second path is increased. Notice that the probability of false alarm is also slightly increased in this case.

Figure 28:
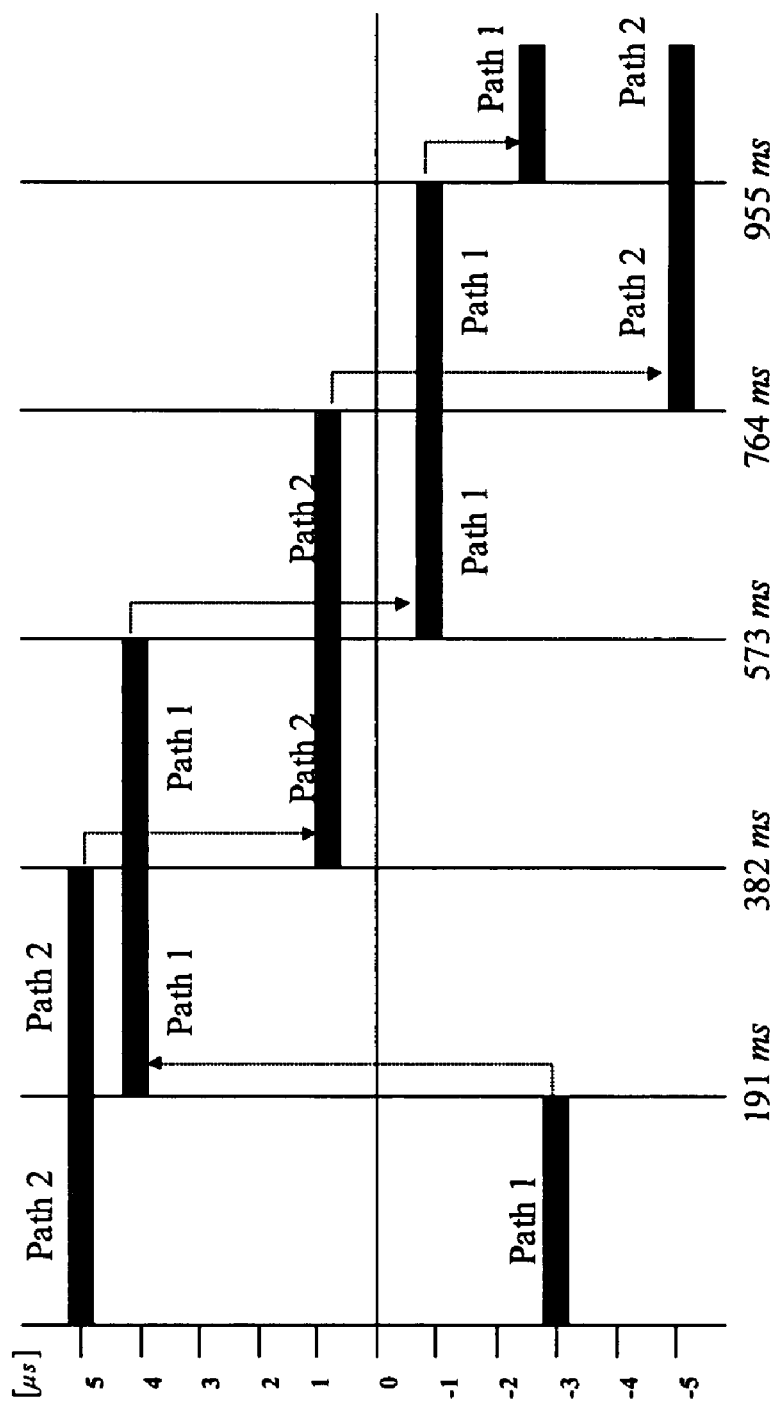
FIG. 28 is a graph of birth-death propagation sequence.

The channel condition of the birth-death propagation is a non-fading propagation channel with two paths. The moving propagation condition has two paths that alternate between birth and death. The positions at which the paths appear are randomly selected with an equal probability and are shown in FIG. 28. The birth-death propagation conditions are as follows:

Step 1: Two paths, Path 1 and Path 2 are randomly selected from the group ([−5, −4, −3, −2, −1, 0, 1, 2, 3, 4, 5]μs). The paths have equal magnitudes and equal phases.

Step 2: After 191 ms, Path 1 vanishes and reappears immediately at a new location randomly selected from the group but excludes the point Path 2. The magnitudes and the phases of the tap coefficients of Path 1 and Path 2 shall remain unaltered.

Step 3: After an additional 191 ms, Path 2 vanishes and reappears immediately at a new location randomly selected from the group but excludes the point Path 1. The magnitudes and the phases of the tap coefficients of Path 1 and Path 2 shall remain unaltered.

Step 4: The sequence in Step 2 and Step 3 is repeated.

Figure 29:
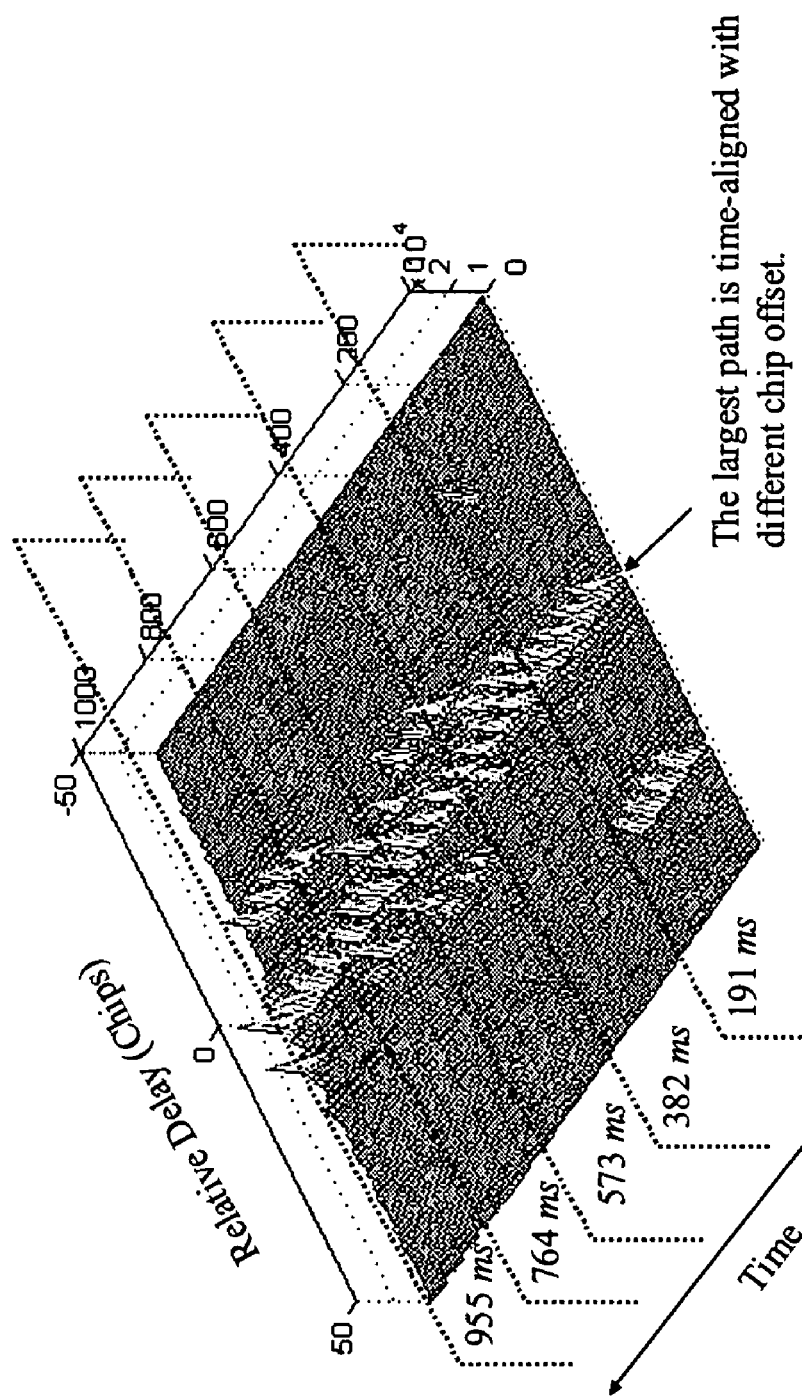
FIG. 29 is a graph of primary synchronization channel (PSC) response.

FIG. 29 shows the simulation results for the PSC channel responses of 100 frame runs (1 sec). Here, the input SNR is 10 dB. There are transitions (birth and death) at every 191 ms. Since the two paths have dominant peaks, it is easy to detect without fading interference. In this figure, the largest path is time-aligned at zero relative delay. The detection and false alarm performances turn out to be $P_D$=1.0 and $P_{FA}$=0.0017, respectively.

Figure 30:
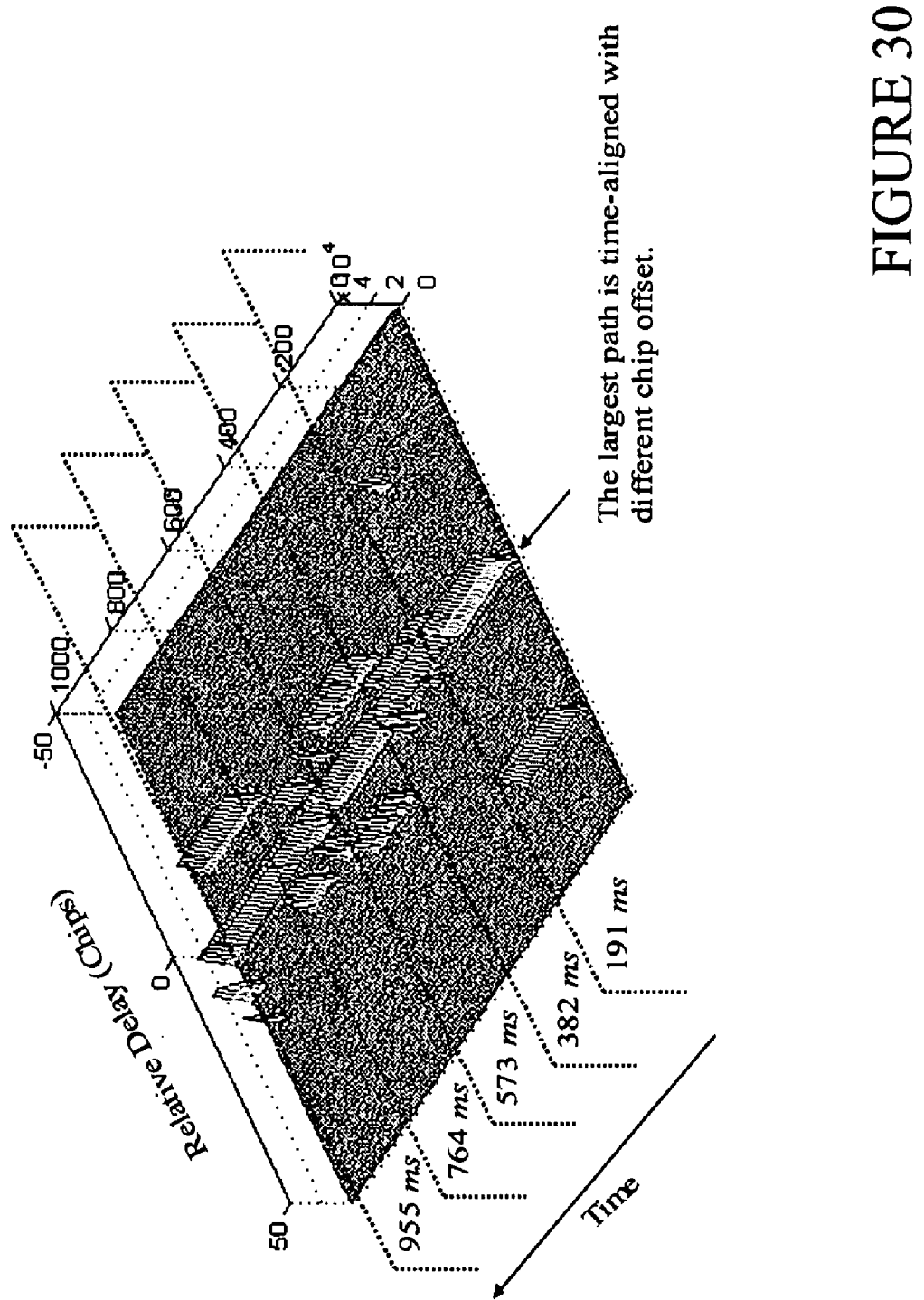
FIG. 30 is a graph of common pilot channel (CPICH) responses.

FIG. 30 shows the simulation results for the CPICH channel responses of 100 frame runs (1 sec). There are transitions (birth and death) at every 191 ms. Two paths are dominant and easily detected without fading interference. The largest path is time-aligned at zero relative delay. In the static channel (AWGN), if the given SNR is higher than 5 dB we expect perfect detection. The detection and false alarm performances turn out to be $P_D$=1.0 and $P_{FA}$=0.0017, respectively.

1. The overall acquisition time is significantly reduced since the dwell time (integration time) is saved. If there is only a verification process, then the dwell time turns out to be about 0.66 sec. If the PSC is used in the initial path search process, then the dwell time is reduced to 0.20 sec. The improvement of the system speed is more than 3 times.

2. For the Relocation, it is easy to redo the path search process to increase the detection performance. It requires extra 0.20 sec, but is still faster than a verification process without path search process.

An alternative embodiment of the present invention utilizes time diverse integration. To overcome slow fading effects, the consecutive symbol integration, disclosed in the preferred embodiment, is modified to time diverse integration. The conventional integration to get the PN correlation power is done by consecutive symbol integration. However in the slow fading channel, deep fading in the integration region causes low detection probability. To mitigate this problem time diverse integration can be used. As set forth above at equation 7, the conventional PN correlation power is computed over a predetermined number, for example 50, of consecutive samples as:

$$P_k^{PN} = \sum_{m=0} \left| \sum_{n=0}^{N-1} r(Nm+n) c^*(Nm+n-k) \right|, m = 0 \rightarrow 49. \tag{34}$$

Time diverse integration, for example, is represented as:

$$P_k^{PN} = \sum_{m \in I} \left| \sum_{n=0}^{N-1} r(Nm+n) c^*(Nm+n-k) \right|, \text{ where } |I| \le 150 \quad (35)$$

I is a selected index set that preferably has no more than 150 elements, e.g. I={0, . . . , 9, 50, . . . , 69, 100, . . . , 199}. The selection of the index set I is made to evaluate correlation power of samples over several different time intervals thus providing time diversity. The calculation of time diverse integration may also be modified and simplified as conventional integration as discussed above with respect to equations 8 through 11.

In general, where communication signals are processed based in part on relative power of signal samples, time diversity can be used to calculate relative power as a function of values corresponding to time diverse signal samples. Preferably, a buffer is provided which stores at least values r(r) that correspond to signal samples $S_r$ that define a set R of samples. R is a subset of X consecutively received signal samples $S_0$ through $S_{X-1}$ that correspond to values r(0) through r(X−1). The number of elements of subset R is less than X such that R contains at least two mutually exclusive subsets of consecutive samples {$S_0$ through $S_i$} and {$S_j$ through $S_{X-1}$} Accordingly, R does not include sample $S_{i+1}$ or $S_{j-1}$. For convenience the buffer may store all values r(0) through r(X−1), but a substantially smaller buffer can be used if only the time diverse subsets of values represented by sample set R are stored.

A processor is operatively associated with the buffer for calculating relative sample power based on values r(r) that correspond to signal sample elements $S_r$ of the selected subset R of X consecutively received signal samples. Values of samples not contained in R, such as values r(i+1) or r(j−1) that correspond to signal sample elements $S_{i+1}$ and $S_{j-1}$, respectively, are not used in the calculation. Accordingly, relative power is calculated based on sample series representing at least two diverse time intervals.

Each pair of consecutive samples represents a sampling time interval t that corresponds to the sampling rate used in obtaining samples of a received signal. Preferably, at least two mutually exclusive subsets of the X consecutive samples exist that contain at least consecutive samples {$S_{i+1}$ through $S_{i+51}$} and {$S_{j-51}$ through $S_{j-1}$}, respectively, and do not contain any elements of subset R. In such case, subset R is defined by at least three mutually exclusive subsets of consecutive samples, which represent groups of consecutive samples mutually offset in time by at least 50 times t. In the above example of Equation 35 where N is 256 (the symbol size used in the CPICH), and I={0–9, 50–69, 100–199}, $P_k^{PN}$ is determined for a small set of samples $S_k$ from values corresponding to the time diverse sample series {$S_0$ through $S_{2559}$}, {$S_{12800}$ through $S_{17919}$} and {$S_{25600}$ through $S_{51199}$} of the larger set of 51,200 samples {$S_0$ through $S_{51199}$} which contains samples $S_k$. Where samples are generated at a rate of one sample per chip duration, this represents time diversity of more than 7000 chips between each of the three sample series upon which the power calculations are based.

Figure 31:
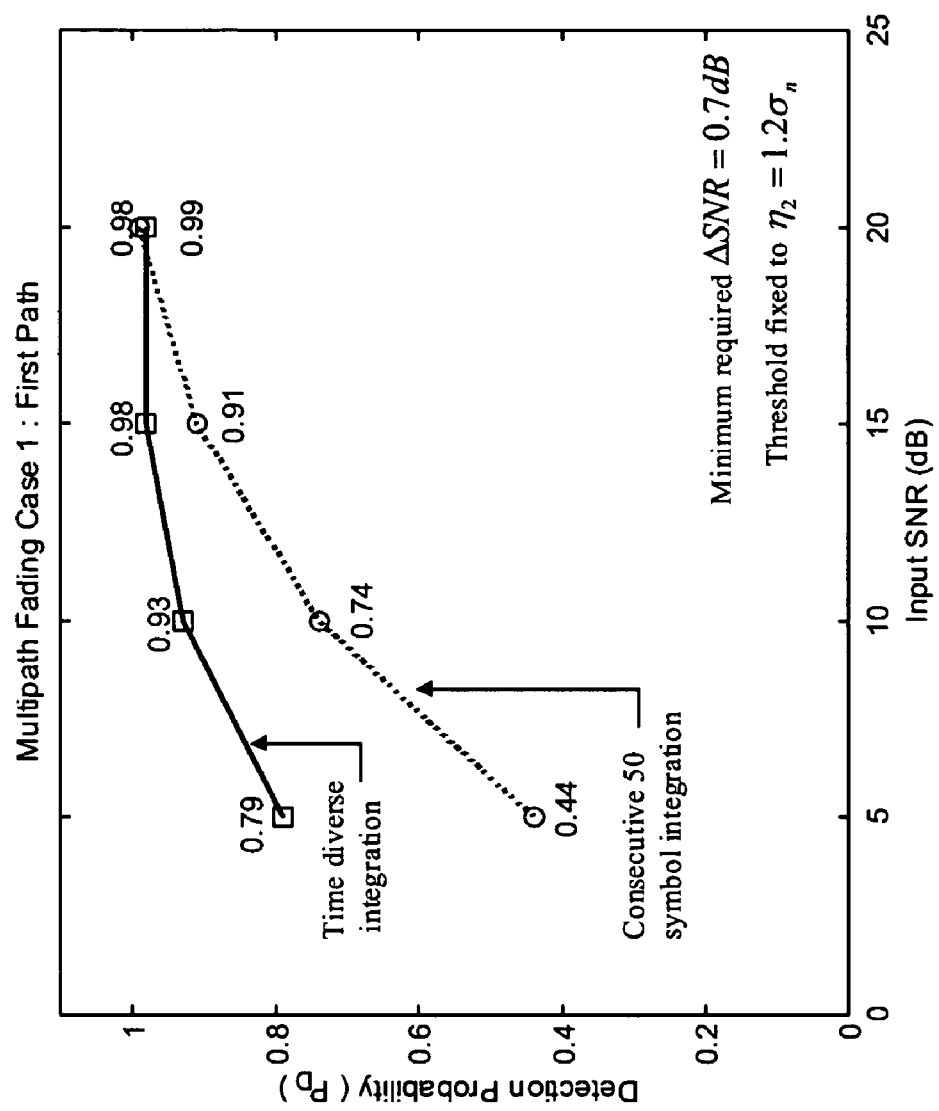
FIG. 31 is a graph of detection probability of the first path (Case 1).

The time diverse integration can play an important role for probability of detection and false alarm performance. FIG. 31 shows that time diverse integration increases the detection performance 44% to 79% at 5 dB SNR with respect to consecutive symbol integration for example. In this case, 35% of detection performance is increased. At 10 dB SNR 19% of detection performance is increased.

Figure 32:
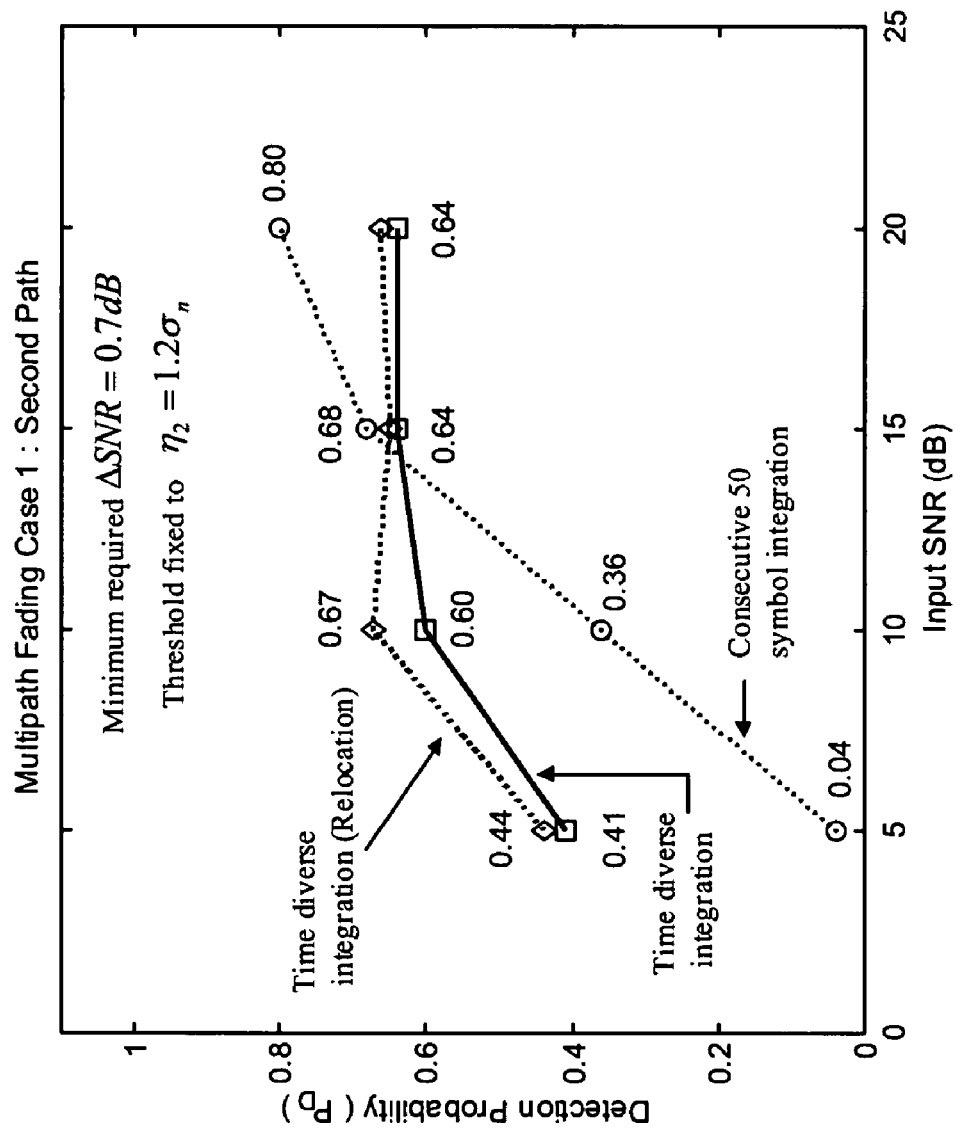
FIG. 32 is a graph of detection probability of the second path (Case 1).

FIG. 32 shows that time diverse integration increases the detection performance 4% to 41% at 5 dB SNR. In this case, 37% of detection performance is increased. At 10 dB SNR 24% of detection performance is increased. The RAKE relocation helps to increase the detection performance. However, it also slightly increases false alarms. To achieve a high detection probability, ΔSNR should be controlled properly, especially at high SNR.

Figure 33:
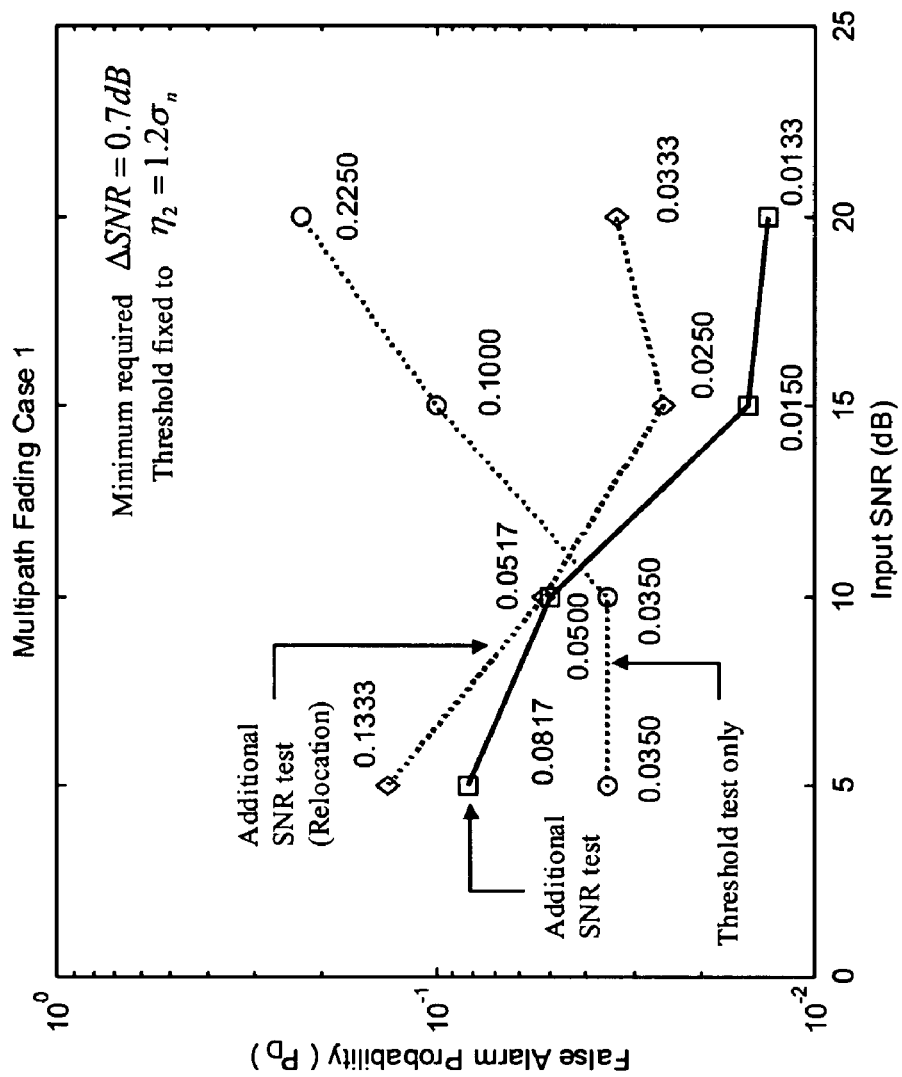
FIG. 33 is a graph of false alarm probability (Case 1).

FIG. 33 shows the probability of false alarm. If only a threshold test is used for the code phase detection, then the false alarm probability is increased as SNR increased. On the other hand, the false alarm probability decreases with the preferred additional SNR test mentioned above for RAKE finger allocation.

The modifications help to increase the detection performance and mitigate the slow fading effect, especially at low SNR case. The additional SNR test helps to reduce the false alarm at high SNR case. More investigation is required to get the best system performance.

With the fixed threshold test, one expects constant false alarm rate (CFAR). But simulation results (threshold test only in FIG. 33) show that as input SNR increases, the false alarm probability is also increased. In this example, the signal power is fixed but the noise power is varying for controlling input SNR, i.e., high input SNR implies low noise power with fixed signal power. Thus, the estimated noise power decreases as SNR increases. Then the threshold becomes low as SNR increases. If the threshold is set too low, there are more chances that the ambiguous correlation coefficients are crossing the threshold. This causes more false alarm probability with high SNR.

Figure 34:
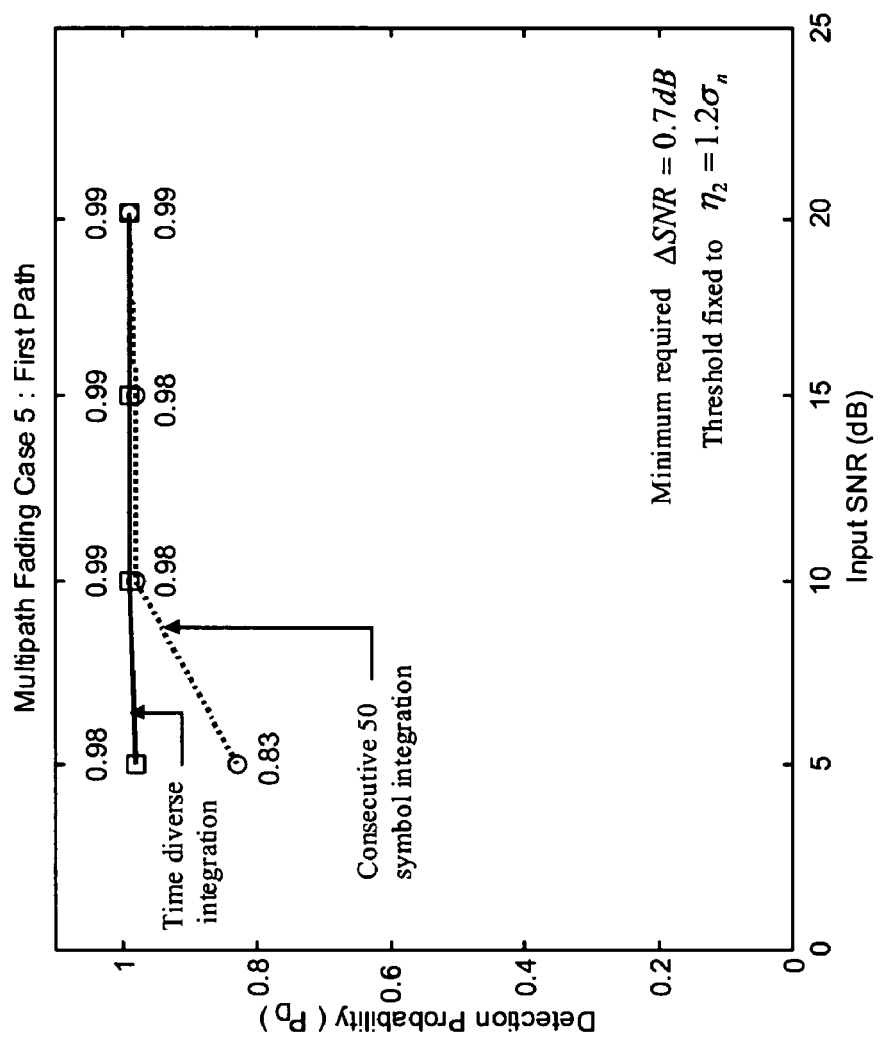
FIG. 34 is a graph of detection probability of the first path (Case 5).

FIG. 34 shows the probability of detection for the first path in the multipath fading Case 5. It shows that the time diverse integration outperforms conventional consecutive integration in the low SNR.

Figure 35:
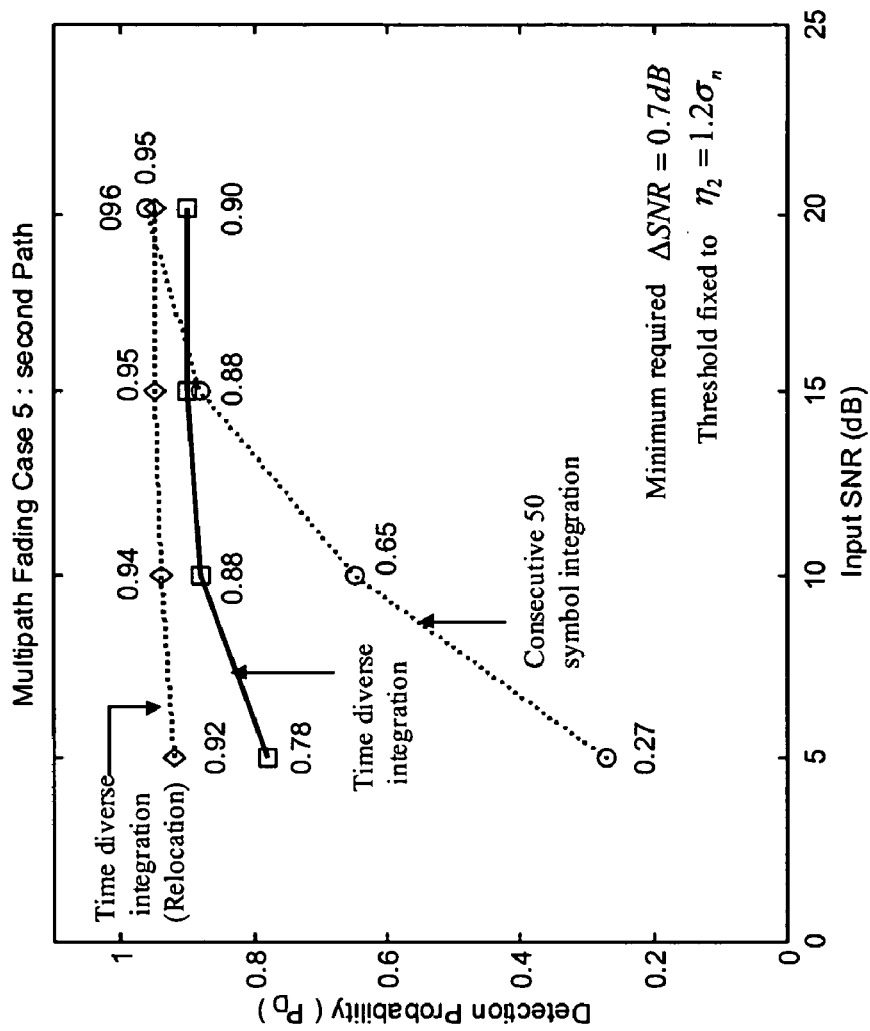
FIG. 35 is a graph of detection probability of the second path (Case 5).

FIG. 35 shows that the time diverse integration gives higher detection performance than consecutive integration. At 5 dB SNR, the probability of detection of the time diverse integration is 51% higher than consecutive integration. Furthermore, relocation process increases the probability of detection even more.

Figure 36:
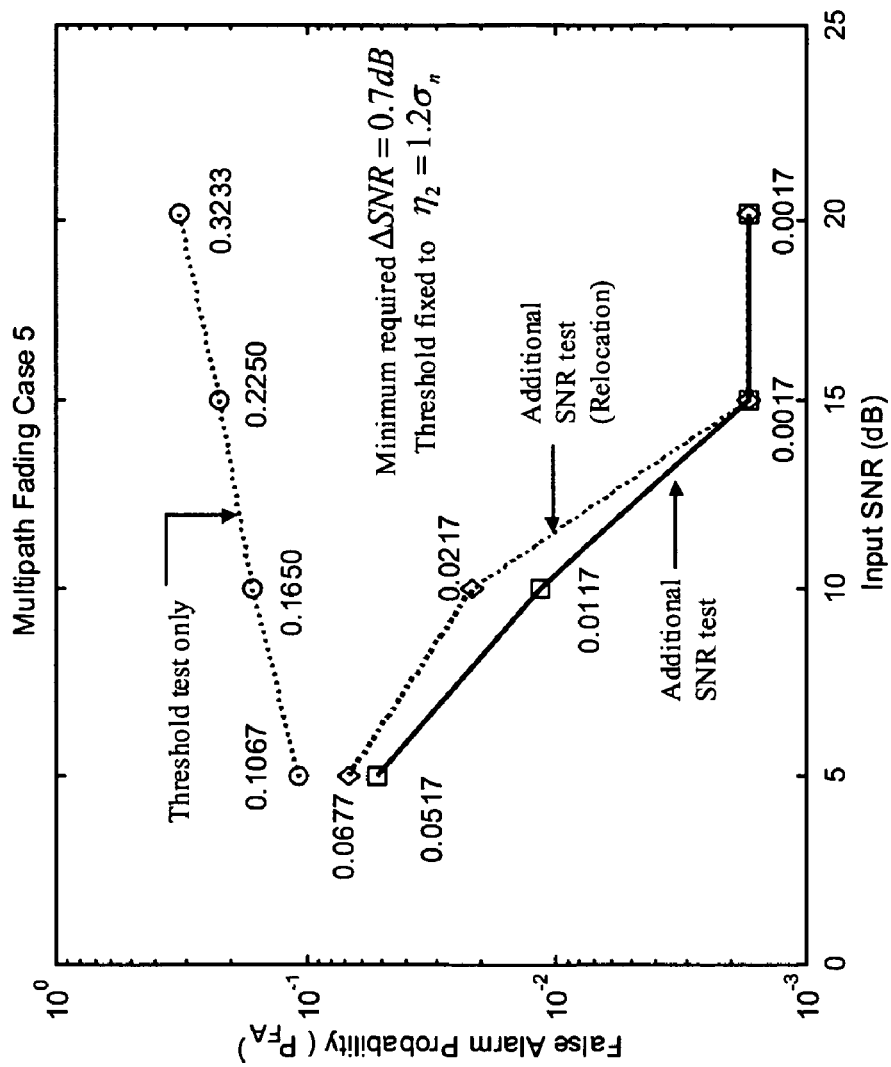
FIG. 36 is a graph of false alarm probability (Case 5).

FIG. 36 shows the probability of false alarm. The probability of false alarm is decreased when using the additional SNR test. The relocation process generates a slightly higher probability of false alarm. Compared to threshold test only, the additional SNR test helps to decrease the probability of false alarm.

What is claimed is:

1. A receiver for receiving wireless communications including a RAKE receiver configurable with a plurality of RAKE fingers for estimating and combining a plurality of different signal paths of a received communication, comprising:

a RAKE finger locator configured to define windows of a predetermined number of consecutive signal samples within a set of samples that each have a first channel power and a second channel power and to calculate an average first channel power of windows;

said RAKE finger locator further configured to determine whether the average first channel power of a window meets a first threshold such that:

if the average first channel power of the window meets the first threshold, the number of samples in that window whose second channel power exceeds a second threshold is identified as a count; and if the count exceeds a preselected number, then that window is allocated to a FAT finger of the RAKE receiver.

2. The receiver of claim 1 wherein said RAKE receiver further comprises a RAKE relocator configured to reassign signal paths when the timing of the signal paths change.

3. The receiver of claim 1 wherein said RAKE receiver is configurable with up to five RAKE fingers of which up to one RAKE finger is a FAT finger.

4. A User Equipment (UE) for a CDMA wireless communication system comprising the receiver of claim 1.

5. A Base Station for a CDMA wireless communication system comprising the receiver of claim 1.

6. A CDMA wireless communication system comprising User Equipments (UEs) and a Base Station that each comprise the receiver of claim 1.

7. The receiver of claim 1 wherein said RAKE finger locator is configured to allocate a window to the FAT finger of the RAKE receiver in connection with comparing that window's count to a lowest value such that:
  if the count meets the lowest value, then the count is compared to a required value;
  if the count meets the required value, then the window is allocated to the Fat finger;
  if the count does not meet the required value, then close signals in the window are pruned;
    the number of pruned signals in the window that meet the second threshold are determined as a pruned count; and
    if the pruned count meets a predetermined acceptable level, then the window is allocated to the Fat finger.

8. A User Equipment (UE) for a CDMA wireless communication system comprising the receiver of claim 7.

9. A Base Station for a CDMA wireless communication system comprising the receiver of claim 7.

10. A CDMA wireless communication system comprising User Equipments (UEs) and a Base Station that each comprise the receiver of claim 7.

11. A receiver for receiving wireless communications including a RAKE receiver configurable with a plurality of RAKE fingers for estimating and combining a plurality of different signal paths of a received communication, comprising:
  a RAKE finger locator configured to process communication signals based on a set of consecutive signal samples where each sample has a first channel power and a second channel power;
  said RAKE finger locator configured to rank samples in descending order according to the first channel power of the samples, to select M largest first channel power samples that are at least two samples apart, and to compare the first channel power of each of the M samples with a predetermined threshold to define a set of L samples, where M is greater than or equal to L and where each of the L samples has a first channel power level greater than the predetermined threshold; and
  said RAKE finger locator further configured to select K largest second power level samples from the L samples, where L is greater than or equal to K, where K is less than or equal to the number of RAKE fingers to be allocated, and where the second channel power level of each of the K samples exceeds a second power level threshold.

12. A User Equipment (UE) for a CDMA wireless communication system comprising the receiver of claim 11.

13. A Base Station for a CDMA wireless communication system comprising the receiver of claim 11.

14. A CDMA wireless communication system comprising User Equipments (UEs) and a Base Station that each comprise the receiver of claim 11.

* * * * *

UNITED STATES PATENT AND TRADEMARK OFFICE
CERTIFICATE OF CORRECTION

PATENT NO. : 7,130,330 B2
APPLICATION NO. : 11/175935
DATED : October 31, 2006
INVENTOR(S) : Reznik et al.

It is certified that error appears in the above-identified patent and that said Letters Patent is hereby corrected as shown below:

IN THE SPECIFICATION

At column 2, line 55, after the word "number", insert --of--.

At column 4, line 6, before the word "signal", delete "to" and insert therefor --to--.

At column 8, line 7, after the word "code", delete "had" and insert therefor --has--.

At column 9, line 32, delete "$p^{(1)} \geq p^{(2)} \geq p^{(3)} \geq,$", and insert therefor -- $p^{(1)} \geq p^{(2)} \geq p^{(3)} \geq \ldots,$ --.

At column 10, line 29, after the word "Therefore", insert --Equation--.

At column 11, line 9, before the words "(10) can be", insert --Equation--.

At column 12, line 19, before the word "counted", delete "is" and insert therefor --are--.

At column 12, line 24, after the word "selected", delete "window.ponents." and insert therefor --window.--.

At column 12, line 31, before the word "counted", delete "is" and insert therefor --are--.

At column 12, line 60, before the word "counted", delete "is" and insert therefor --are--.

At column 16, line 42, after the word "alarm", delete "$P_F$" and insert therefor --$P_{FA}$--.

At column 16, line 44, after the word "alarm", delete "$P_F$" and insert therefor --$P_{FA}$--.

At column 17, line 43, before the words "to Case", delete "Compare" and insert therefor --Compared--.

At column 19, line 29, after the word "has", insert --been--.

At column 20, line 23, after the word "peaks", delete "it is" and insert therefor --they are--.

At column 21, line 28, after the word "through" delete "$S_x-1\}$" and insert therefor --$S_{x-1}\}$--.

UNITED STATES PATENT AND TRADEMARK OFFICE
CERTIFICATE OF CORRECTION

PATENT NO. : 7,130,330 B2
APPLICATION NO. : 11/175935
DATED : October 31, 2006
INVENTOR(S) : Reznik et al.

It is certified that error appears in the above-identified patent and that said Letters Patent is hereby corrected as shown below:

At column 21, line 55, before the words "is determined", delete "$P^{kPN}$" and insert therefor --$P_k^{PN}$--.

Signed and Sealed this

Thirty-first Day of July, 2007

JON W. DUDAS
*Director of the United States Patent and Trademark Office*